(12) United States Patent
Quan et al.

(10) Patent No.: US 12,132,314 B2
(45) Date of Patent: Oct. 29, 2024

(54) METHOD AND SYSTEM FOR REAL-TIME, OR NEAR REAL-TIME, BALANCING OF AN ELECTRICAL DISTRIBUTION GRID

(71) Applicant: Electronic Grid Systems Inc., Edmonton (CA)

(72) Inventors: Zhongyi Quan, Edmonton (CA); Hao Tian, Edmonton (CA)

(73) Assignee: Electronic Grid Systems Inc., Edmonton (CA)

( * ) Notice: Subject to any disclaimer, the term of this patent is extended or adjusted under 35 U.S.C. 154(b) by 130 days.

(21) Appl. No.: 18/066,386

(22) Filed: Dec. 15, 2022

(65) Prior Publication Data

US 2023/0223758 A1 Jul. 13, 2023

Related U.S. Application Data

(60) Provisional application No. 63/297,967, filed on Jan. 10, 2022, provisional application No. 63/297,556, filed on Jan. 7, 2022.

(51) Int. Cl.
| | | |
|---|---|---|
| *H02J 3/32* | (2006.01) | |
| *B60L 53/62* | (2019.01) | |
| *B60L 53/63* | (2019.01) | |
| *H02J 3/16* | (2006.01) | |

(52) U.S. Cl.
CPC .............. *H02J 3/322* (2020.01); *B60L 53/62* (2019.02); *B60L 53/63* (2019.02); *H02J 3/16* (2013.01)

(58) Field of Classification Search
CPC ..... H02J 3/322; H02J 3/16; H02J 3/32; B60L 53/62–63

USPC .................................................. 307/9.1, 10.1
See application file for complete search history.

(56) References Cited

U.S. PATENT DOCUMENTS

| | | | |
|---|---|---|---|
| 7,177,165 B2 | 2/2007 | Deng et al. | |
| 8,780,593 B2 | 7/2014 | Wang et al. | |
| 9,190,846 B2 | 11/2015 | Eiland et al. | |
| 9,293,922 B2 | 3/2016 | Divan et al. | |
| 10,680,438 B2 | 6/2020 | Divan et al. | |
| 10,756,543 B2 | 8/2020 | Detmers et al. | |
| 10,782,721 B2 | 9/2020 | Erhart et al. | |
| 2010/0114400 A1* | 5/2010 | Feng .................. | H02J 3/00 700/298 |
| 2015/0311718 A1 | 10/2015 | Divan et al. | |
| 2022/0244076 A1* | 8/2022 | Karlgaard ............ | H02J 3/381 |
| 2023/0117226 A1* | 4/2023 | Kerdelhue ......... | G01R 31/3842 320/109 |
| 2023/0402869 A1* | 12/2023 | Lee ..................... | H02J 3/322 |

* cited by examiner

*Primary Examiner* — Rexford N Barnie
*Assistant Examiner* — Swarna N Chowdhuri

(57) ABSTRACT

Various embodiments disclosed herein generally relate to methods and systems for real-time, or near real-time, balancing of an electrical distribution grid. According to at least one embodiment, there is provided one or more local balancing systems, each comprising: an energy storage unit (ESU) operable to store direct current (DC) power; a power converter comprising a DC side and an AC side, the power converter being operable to convert between single-phase (AC) power and DC power, wherein the DC side is electrically coupled to the ESU and the AC side is electrically couplable to at least one secondary distribution block in a secondary distribution grid; and a local controller coupled to the power converter and operable to control the power converter to convert between DC power and AC power.

30 Claims, 26 Drawing Sheets

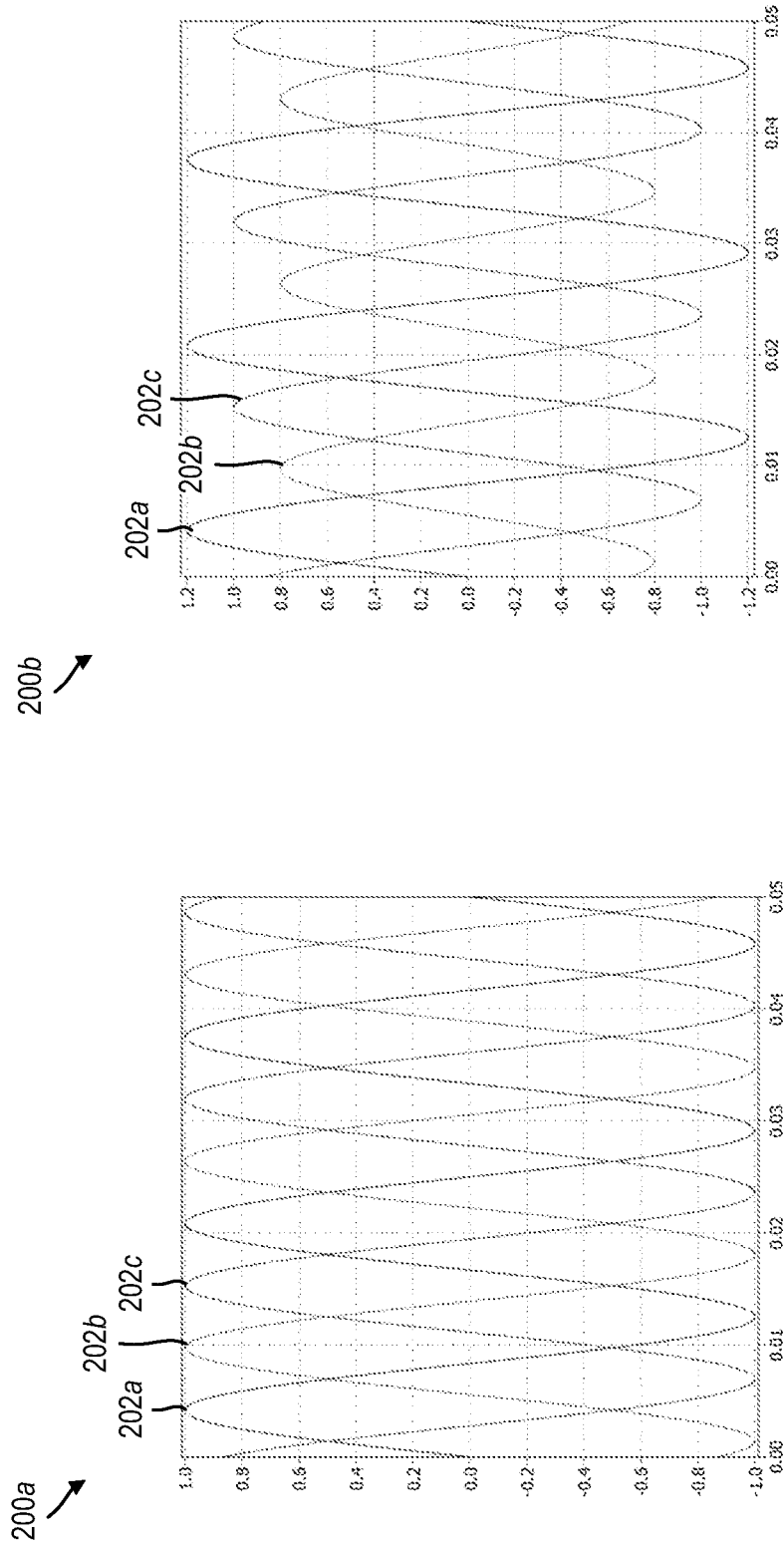

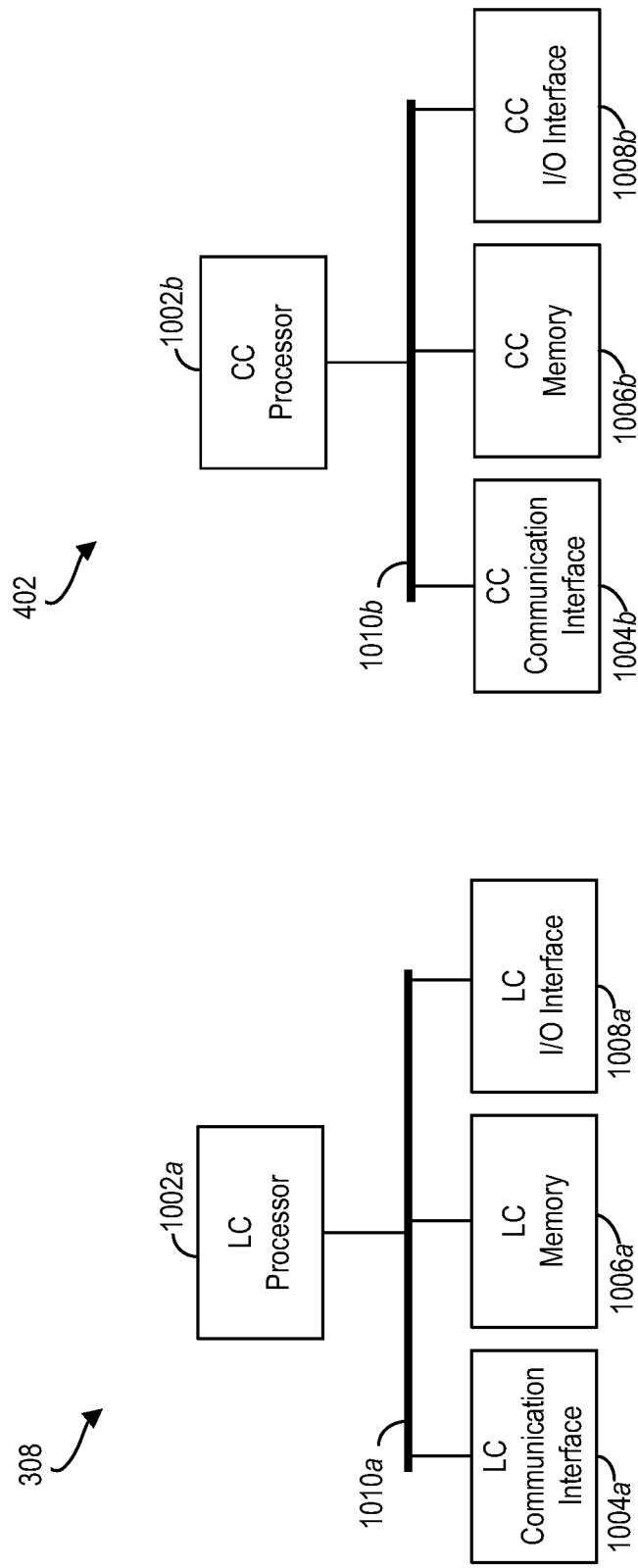

METHOD AND SYSTEM FOR REAL-TIME, OR NEAR REAL-TIME, BALANCING OF AN ELECTRICAL DISTRIBUTION GRID

CROSS-REFERENCE TO RELATED PATENT APPLICATIONS

This application claims the benefit of U.S. Provisional Patent Application No. 63/297,556, filed on Jan. 7, 2022 and U.S. Provisional Patent Application No. 63/297,967, filed on Jan. 10, 2022. The entire content of each of U.S. Provisional Patent Application No. 63/297,556 and U.S. Provisional Patent Application No. 63/297,967 is incorporated herein by reference.

FIELD

Various embodiments are described herein that generally relate to electrical distribution grids, and in particular, to a method and system for real-time, or near real-time, balancing of an electrical distribution grid.

INTRODUCTION

The following is not an admission that anything discussed below is part of the prior art or part of the common general knowledge of a person skilled in the art.

In an attempt to reduce carbon emissions and tackle climate change, there has been a heightened penetration, in recent years, of renewable energy resources in the form of consumer-side distributed energy resources (DERs) (e.g., photovoltaic solar power cells), as well as an increased adoption of electric vehicles (EVs). However, the increased connectedness of DERs, as well as EV loads, has introduced unique challenges to already overstretched distribution grids.

SUMMARY OF VARIOUS EMBODIMENTS

According to one broad aspect, there is disclosed a local balancing system comprising: an energy storage unit (ESU) operable to store direct current (DC) power; a power converter comprising a DC side and an AC side, the power converter being operable to convert between single-phase (AC) power and DC power, wherein the DC side is electrically coupled to the ESU and the AC side is electrically couplable to at least one secondary distribution block in a secondary distribution grid; and a local controller coupled to the power converter and operable to control the power converter to convert between DC power and AC power, wherein the local controller is configured to: determine a voltage in the at least one secondary grid block; determine if the voltage is below a voltage setpoint; if the voltage is below the voltage setpoint, control the converter to convert DC power, stored in the ESU, into single-phase AC power that is injected into the at least one secondary grid block; and if the voltage is above the voltage setpoint, control the converter to draw single-phase AC power from the at least one secondary grid block, and convert the single-phase AC power into DC power that is stored in the ESU.

In at least one embodiment, the local controller is further configured to: prior to determining if the current voltage is below the voltage setpoint, determine that the current voltage is outside a pre-determined range of the voltage setpoint.

In at least one embodiment, the ESU comprises one or more batteries, super capacitors, or fuel cells.

In at least one embodiment, the power converter is a single-stage or multi-stage AC-DC converter.

In at least one embodiment, the local controller includes a communication interface for communicating with a central controller.

In at least one embodiment, the local controller is further configured to: initially receive, via the communication interface, a control signal from the central controller, the control signal including the voltage setpoint.

In at least one embodiment, the local balancing system further comprises one or more sensors that are coupled to the local controller, wherein the local controller is further configured to: based on sensor data received from the one or more sensors, monitor operating state data of the at least one secondary grid block; and transmit, via the communication interface, one or more operating state signals to the central controller, the one or more operating state signals including the operating state data.

In at least one embodiment, the one or more sensors comprise one or more of a voltage sensor or a current sensor.

In at least one embodiment, the operating state data comprises one or more of voltage data, current data and power flow data in the at least one secondary grid block.

In at least one embodiment, the one or more sensors are located around a distribution transformer that couples the at least one secondary distribution block to a primary distribution grid.

In at least one embodiment, a distribution transformer couples the at least one secondary distribution block to a primary distribution grid, and the local balancing system is connected to the at least one secondary distribution block at a second side of the distribution transformer.

In at least one embodiment, the local controller is further configured to: determine a power flow through the at least one secondary grid block; determine that the power flow is greater than a power limit; and in response, initiate a demand response.

In at least one embodiment, determining if the voltage is less than a voltage setpoint is performed by the local controller after determining that the power flow is greater than a power limit.

In at least one embodiment, the demand response comprises controlling the converter to convert DC power stored in the ESU into single-phase AC power that is injected into the at least one secondary grid block.

In at least one embodiment, the local balancing system further comprises one or more DC feeders connected to the DC side of the power converter, wherein the DC feeders are couplable to an external DC grid.

In at least one embodiment, the at least one secondary distribution block includes one or more controllable single-phase nodes, and the local controller is configured to communicate with the one or more controllable single-phase nodes.

In at least one embodiment, the one or more controllable single-phase active nodes comprise one or more of controllable electric loads and controllable electrical sources.

In at least one embodiment, the electrical sources comprise distributed energy resources (DERs) and the electrical loads comprise activated electrical vehicle (EV) chargers.

In at least one embodiment, the local controller is further configured to: if the voltage is less than the voltage setpoint, determine a reference power value; determine if the ESU is sufficiently charged; if the ESU is sufficiently charged, control one or more of the converter, controllable electrical loads and controllable electrical sources to decrease demand and increase electrical power injection; and if the ESU is not sufficiently charged, control one or more of the controllable electrical loads and controllable electrical sources to decrease demand and increase electrical power injection.

In at least one embodiment, the local controller is further configured to: if the current voltage is not less than the voltage setpoint, determine a reference power value; determine if the ESU has capacity for charging; if the ESU has capacity for charging, controlling one or more of the converter, controllable electrical loads and controllable electrical sources to decrease demand and increase electrical power injection; and if the ESU does not have capacity for charging, control one or more of the controllable electrical loads and controllable electrical sources to decrease demand and increase electrical power injection.

In at least one embodiment, the local balancing system is connectable in parallel with one or more other local balancing systems to form a multi-phase balancing system.

According to another broad aspect, there is disclosed a method for balancing a secondary distribution grid, comprising: determining a voltage in at least one secondary grid block; determining if the voltage is below a voltage setpoint; if the voltage is below the voltage setpoint, controlling a converter to convert DC power, stored in an energy storage unit (ESU), into single-phase AC power that is injected into the at least one secondary grid block; and if the voltage is above the voltage setpoint, controlling the converter to draw single-phase AC power from the at least one secondary grid block, and converting the single-phase AC power into DC power that is stored in the ESU.

According to another broad aspect, there is disclosed a central controller comprising at least one processor coupled to a communication interface, the at least one processor being configured to: receive, via the communication interface, at least one operating state signal from at least one local controller, the at least one local controller is associated with a local balancing system connected to a secondary grid block of a plurality of secondary distribution grid blocks; determine, based on the at least one operating state signal, a current operating status of a secondary distribution grid; determine if the current operating status is within an acceptable range; if the current operating status is not within an acceptable range, determine that the secondary distribution grid is imbalanced; identify one or more target secondary grid blocks, of the plurality of secondary distribution grid blocks, causing the imbalance; generate operating control instructions for the one or more target secondary grid blocks; and transmit control signals to one or more local controllers associated with the one or more target secondary grid blocks, the control signals comprising the operating control instructions.

In at least one embodiment, determining a current operating status of the secondary distribution grid comprises determining a system wide power demand; determining if the current operating status is satisfactory comprises determining if the system wide power demand exceeds a target system power limit; generating the operating control instructions comprises determining power limit instructions for the one or more target secondary grid blocks; and the control signals includes the power limit instructions.

In at least one embodiment, determining a current operating status of the secondary distribution grid comprises determining a magnitude of each phase voltage in the grid; determining if the current operating status is within an acceptable range comprises determining if the phase voltages are balanced; generating the operating control instructions comprises determining voltage setpoints for the one or more target secondary grid blocks; and the control signals includes the voltage setpoints.

According to another broad aspect, there is disclosed a method for balancing a secondary distribution grid, comprising: receiving at least one operating state signal from at least one local controller, the at least one local controller is associated with a local balancing system connected to a secondary grid block of a plurality of secondary distribution grid blocks; determining, based on the at least one operating state signal, a current operating status of a secondary distribution grid; determining if the current operating status is within an acceptable range; if the current operating status is not within an acceptable range, determining that the secondary distribution grid is imbalanced; identifying one or more target secondary grid blocks, of the plurality of secondary distribution grid blocks, causing the imbalance; generating operating control instructions for the one or more target secondary grid blocks; and transmitting control signals to one or more local controllers associated with the one or more target secondary grid blocks, the control signals comprising the operating control instructions.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 2A shows an example simulated plot of various single-phase voltages in a healthy power distribution grid;

FIG. 2B shows another example simulated plot representative of the effect of increased penetration of single-phase active nodes on a three-phase electrical distribution grid;

FIG. 10A shows a simplified block diagram of an example embodiment a local controller; and FIG. 10B shows a simplified block diagram of an example embodiment a central controller.

Further aspects and features of the example embodiments described herein will appear from the following description taken together with the accompanying drawings.

DETAILED DESCRIPTION OF THE EMBODIMENTS

Figure 1A:
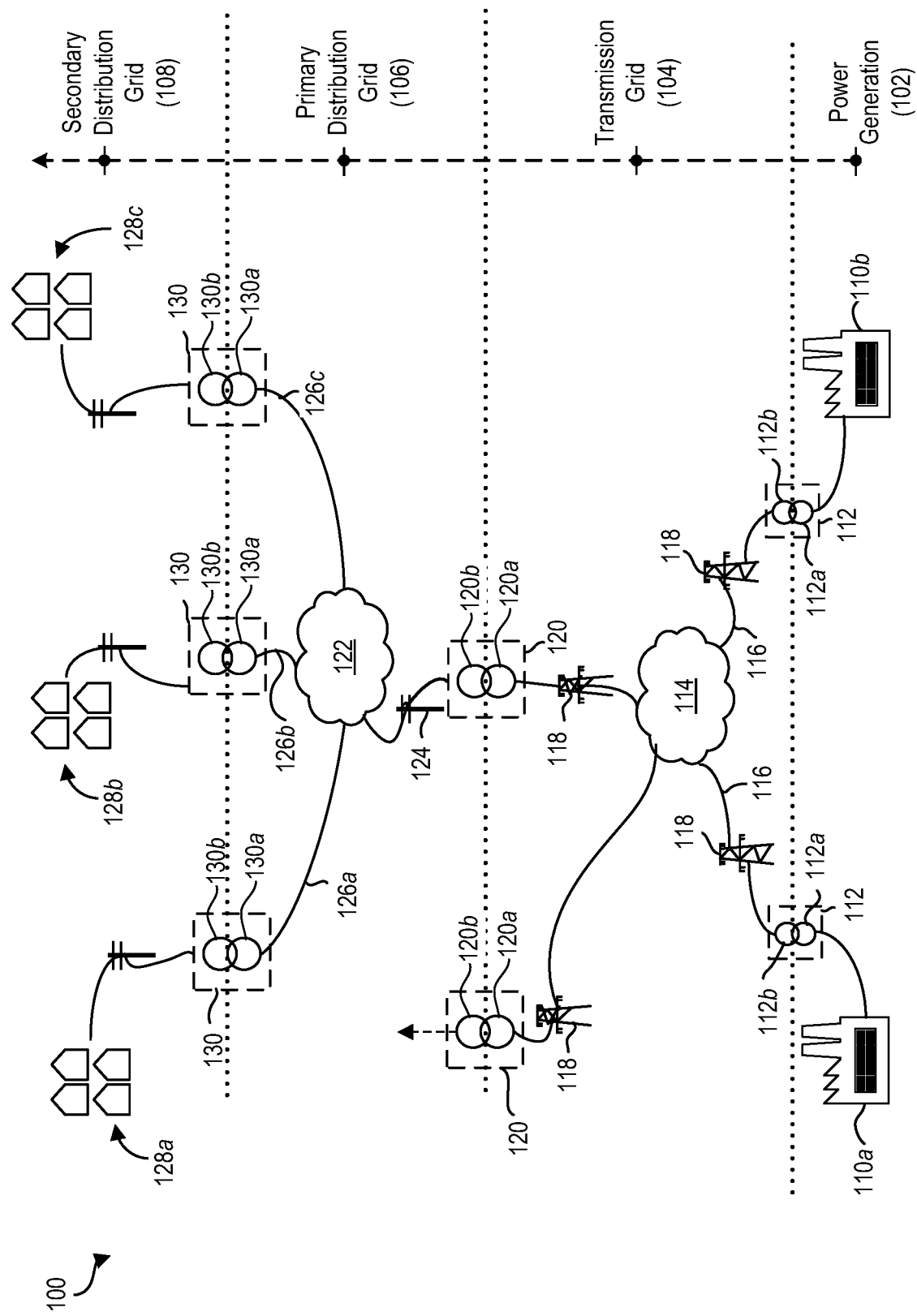
FIG. 1A show an example architecture for an electrical grid.

Reference is now made to FIG. 1A, which illustrates an example architecture for an electrical grid 100. The architecture of electrical grid 100 may be characteristic of a typical architecture for an electrical grid found in most regions of North America.

As shown, the electrical grid 100 generally includes four components: (i) a power generation stage 102, (ii) a transmission grid 104, (iii) a primary distribution grid 106, and (iv) a secondary distribution grid 108.

Power generation stage 102 includes one or more power generating plants 110a, 110b (e.g., coal, nuclear, hydroelectric, etc.) for generating electricity. In most cases, the electricity, generated by plants 106, is three-phase alternating current (AC) power. The three phases can correspond, for example, to a phase "A", phase "B" and phase "C", whereby each of phases A to C are 120° of out-of-phase.

Electricity generated by the power plants 110 is fed into a large high-voltage transmission grid 104. This can occur via one or more step-up transformers 112. Each transformer 112 operates to step-up the electricity to within a high voltage or an extra high voltage range (e.g., 110 kilovolt (kV) and above). In some cases, step-up transformers 112 are located within transmission substations that are positioned proximal to the plants 110. To this end, each step-up transformers 112 can include a primary side 112a connected to a respective plant 110, and a secondary side 112b connected to the transmission grid 104.

Inside the transmission grid 104, the generated AC power is routed through a large transmission network 114. Transmission network 114 can include, for example, a plurality of transmission cables 116. The transmission cables 116 combine and route electricity from multiple plants 110 to various distribution regions. Transmission cables 116 may either travel overhead, via large transmission towers 118, or alternatively, may be burrowed underground.

From the transmission grid 104, the three-phase AC power is further fed into one or more primary distribution grids 106. Each primary grid 106 services a different geographic region or area. In some cases, prior to being fed into the primary grid 106, a number of transmission substations—included in the transmission network 114 (not shown)—may lower the transmission voltage to a sub-transmission voltage (e.g., 66 kV or 115 kV).

One or more distribution substations feed power from the transmission grid 104 into the primary grid 106. Each distribution substation can include a large step-down transformer 120 that lowers the transmission, or sub-transmission, voltage to a voltage suitable for end-user distribution. As shown, each step-down transformer 120 includes a primary side 120a coupled to the transmission grid 104, and secondary side 120b coupled to a respective primary grid 106. The distribution substation typically reduces the high voltage (HV) or extra-high voltage (EHV) power, in the transmission grid 104, to a medium voltage (MV) (e.g., 3.3 kV to 35 kV) that is more suitable for most industrial, commercial, and residential needs.

Inside the primary grid 106, electricity is again routed through a network 122 of distribution cables 126. The distribution cables 126 are typically supported by smaller distribution and/or utility poles 124, or are otherwise burrowed underground.

From the primary grid 106, electricity is again fed into a secondary distribution grid 108. Secondary distribution grid 108 is comprised of localized residential and/or commercial neighborhoods or sub-geographic regions or areas 128a-128c (also referred to herein interchangeably as secondary distribution grid blocks 128, secondary grid blocks 128, secondary distribution grid portions 128 or secondary grid portions 128).

The connection between the primary distribution grid 106 and a respective secondary distribution block 128 occurs via a distribution transformer 130 (e.g., a residential transformer). Each distribution transformer 130 can include a primary side 130a connected to the primary grid 106, and a secondary side 130b connected to a corresponding secondary grid block 128. Each distribution transformer 130 operates to step-down the electric voltage to a low voltage (LV) range (e.g., up to 1 kV) that is useful for end-user consumption. In most cases, the voltage is stepped-down to a range of 115 V, 120 V or 240 V AC. Owing to the reduced voltage, most secondary distribution lines may only run for a limited length (e.g., 250 feet).

In conventional North American grids, the voltage delivered to each distribution transformer 130 is a single-phase AC voltage. For example, each distribution cable 126a-126c, feeding into a respective distribution transformer 130, may carry only a single-phase of the three-phase AC power distributed by the primary grid 106. In this manner, each secondary grid block 128 receives stepped-down single-phase AC electric power from the primary grid 106. In contrast, in conventional European grids, each secondary block 128 may receive stepped-down three-phase AC power from the primary grid 128, whereby the stepped-down power may have a reduced voltage in a range of 220V, 230V or 240V.

Figure 1B:
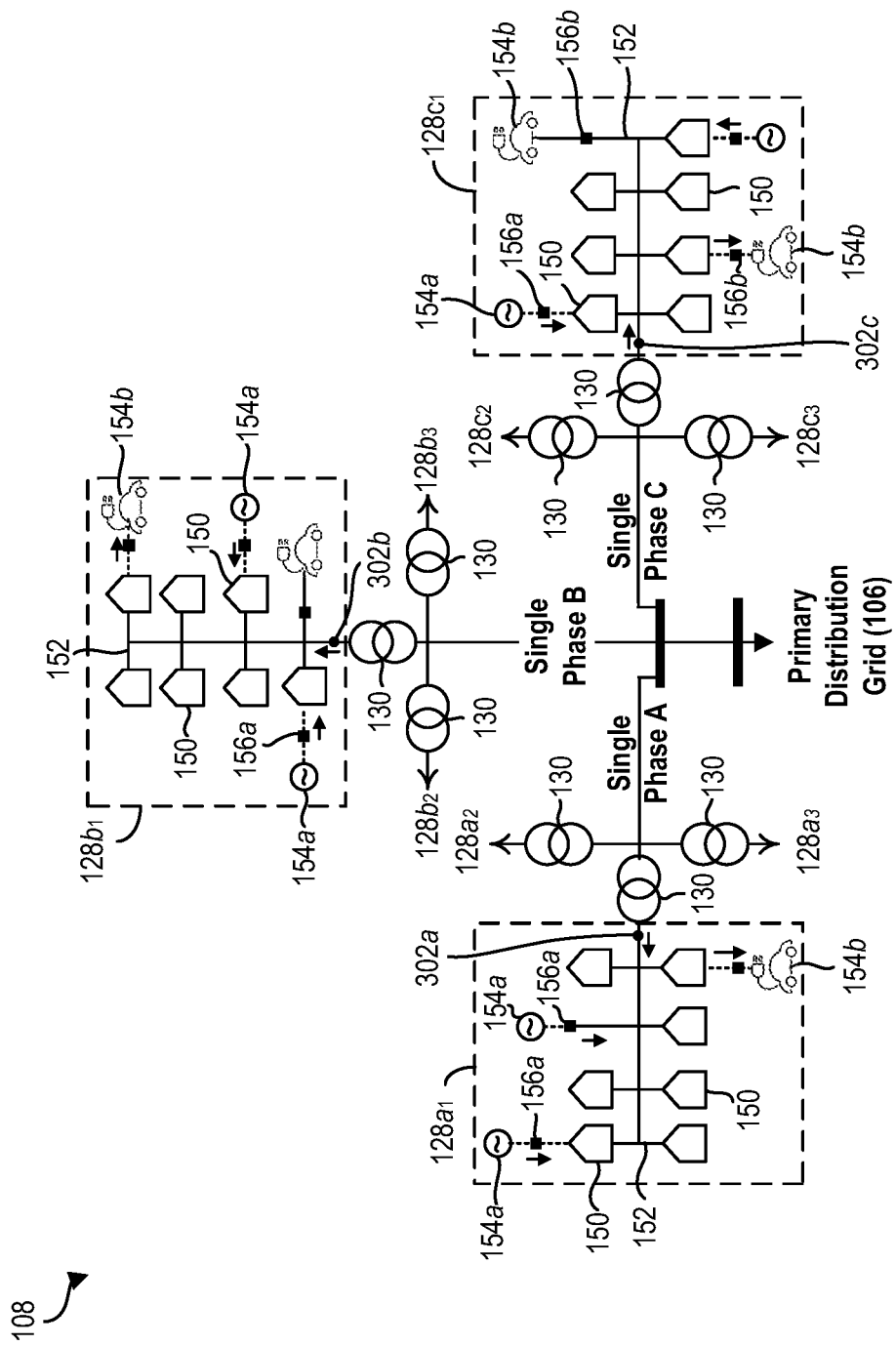
FIG. 1B shows an example design of a secondary distribution grid, in accordance with some embodiments.

Reference is now made to FIG. 1B, which illustrates a design for an example secondary distribution grid 108.

As shown, the secondary distribution grid 108 can include a plurality of secondary grid blocks 128a-128c. Each secondary grid block 128 is connected to the primary grid 106 via a corresponding distribution transformer 130. In some cases, multiple secondary grid blocks 128 may be connected to the primary grid 106 via one or more shared distribution transformers 130 (FIG. 8C). As explained previously, each distribution transformer 130 may operate to step-down the voltage from a mid-voltage (MV) range (e.g., 3.3 kV to 35 kV) to a low voltage (LV) range (e.g., below 1 kV, and typically 120 V or 240 V in a North American grid) for end-user consumption.

As further explained, in an example North American grid, each secondary grid block 128 receives single-phase AC power from the primary grid 106. For example, secondary grid blocks $128a_1$-$128a_3$ may receive single phase "A" power, secondary grid blocks $128b_1$-$128b_3$ may receive single phase "B" power, while secondary grid blocks $128c_1$-$128c_3$ c may receive single phase "C" power.

In at least some cases, each secondary grid block 128 may include a plurality of power consuming entities 150 (e.g., end-user consumers) that receive the single-phase AC power. The AC power is delivered to the entities 150 via one or more feeder or distribution lines 152 that are connected to the secondary side 130b of the distribution transformer 130. Entities 150 can include, by way of non-limiting examples, residential houses or commercial buildings.

As stated in the introduction, in recent years, there has been a heightened penetration of single-phase consumer-side electrical power sources 154a and electric loads 154b which are connected to the secondary grid 108 (collectively referred to herein as single-phase active electric nodes 154, single-phase active nodes or simply single-phase nodes). The increased penetration of these nodes has been largely driven by an effort to reduce carbon emissions and address issues of climate change. To this end, examples of single-phase sources 154a include consumer-side distributed energy resources (DERs). DERs can comprise decentralized electricity-producing resources including, for example, photovoltaic solar power cells and wind power generators. Examples of single-phase electric loads 154b include electric vehicle (EV) chargers for charging EVs.

As shown, single-phase active nodes 154 may be connected directly or in-directly to the secondary grid 108, via inverters 156. For example, inverters 156a can convert DC power, generated by an electricity source (e.g., a solar cell or DC power storage unit), into consumable single-phase AC power. Similarly, inverters 156b can convert single-phase AC power from the secondary grid into DC power that may be delivered, for example, to an electric load 154b such as an electric vehicle battery.

Significantly, the increased penetration of single-phase active nodes 154 into the secondary grid 108 has had an adverse effect on the quality of the electrical distribution grid. For example, increased penetration of single-phase active nodes often results in imbalanced grid voltages, or otherwise an imbalance between various grid voltage phases. In many cases, this imbalance causes stress to the service lines and to other three-phase loads, and in turn, results in significant financial loss. To this end, voltages should be balanced in an electric distribution system to reduce financial loss and to extend the lifetime of the system.

The effect of increased penetration of single phase nodes 154 in a secondary grid 108 is illustrated with reference to FIGS. 2A and 2B.

FIG. 2A shows an example simulated plot 200a of various single-phase voltages in an ideal and healthy three-phase power distribution grid.

As shown, plot 200a includes a plots line 202a corresponding to the voltage of single-phase "A" (e.g., servicing secondary grid blocks $128a_1$-$128a_3$), a plot line 202b corresponding to the voltage of single-phase "B" (e.g., servicing secondary grid blocks $128b_1$-$128b_3$) and a plot line 202c corresponding to the voltage of single-phase "C" (e.g., servicing secondary grid blocks $128c_1$-$128c_3$). As shown, in the idealized case, the three voltage phases 202a, 202b, 202c are of a generally equal magnitude.

FIG. 2B shows another example simulated plot 200b representative of the effect of the increased penetration of single-phase active nodes on the three-phase distribution grid.

In particular, consequent of the increased penetration of single-phase nodes, the grid voltages are now imbalanced and plot lines 202a-202c are unequal. For example, plot line 202a (e.g., phase voltage "A") may have a higher voltage magnitude than plot lines 202b and 202c (e.g., phase voltages "B" and "C", respectively). The increased voltage of phase "A" may be consequent, for example, of more electrical power sources, e.g., DERs 154a, being actively connected to secondary grid blocks 128a serviced by phase "A" power. The increased number of electrical sources 154a inject more single-phase "A" power into the respective secondary grid blocks 128a, thereby increasing the magnitude of the phase "A" voltage.

In contrast, plot line 202b (e.g., phase voltage "B") may have a lower voltage magnitude than the remaining plot lines. This may be consequent of more single-phase electric loads 154b being connected to secondary grid blocks 128b serviced by phase "B" power. In particular, the increased electric loads absorb more single-phase "B" power, resulting in a decrease in the magnitude of the phase "B" voltage.

Figure 1C:
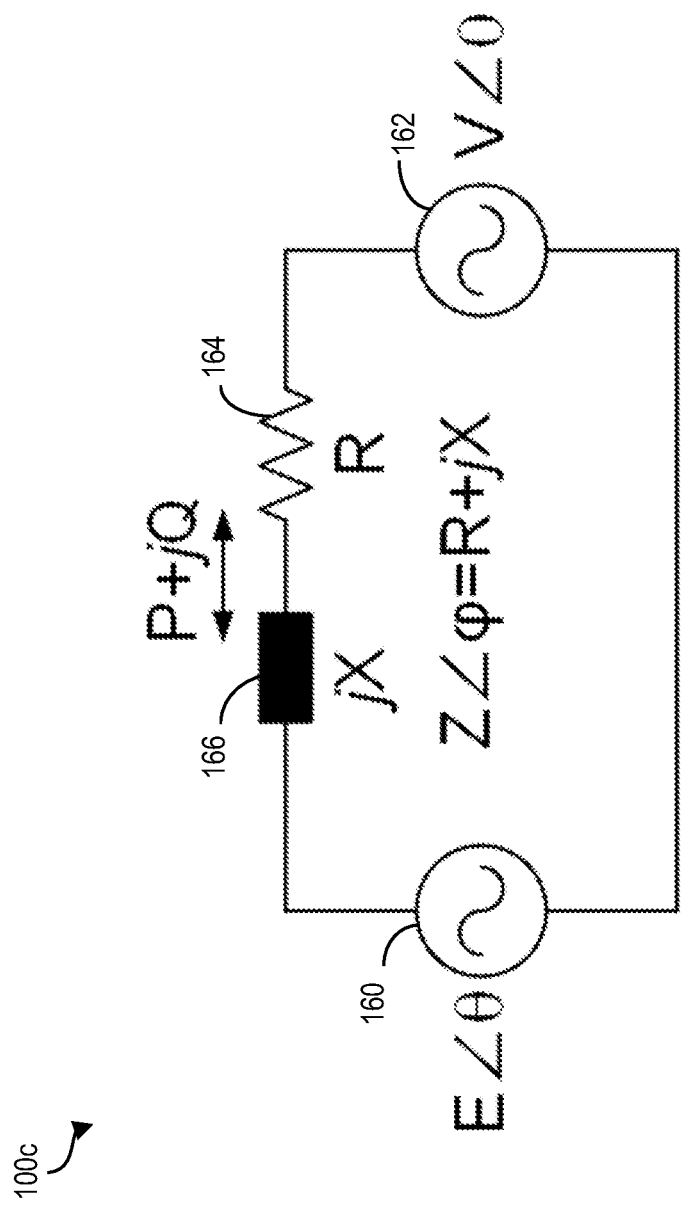
FIG. 1C shows an example circuit that models the effect of connecting a single-phase active node to an electrical distribution grid.

Reference is now made to FIG. 1C, which illustrates an example circuit 100c modelling the effect of connecting a single-phase node to an electric distribution grid.

In the model circuit 100c, the voltage from an inverter, connected to the secondary distribution grid, is represented by the variable "E" 160. The inverter may be a solar inverter or a battery inverter 156, that couples a single-phase node to the grid. The variable "V" 162 expresses the grid voltage, while "P" and "Q" represent respective active power and reactive power injected to or drawn from the grid. The angle difference between "E" and "V" is denoted by "φ". The cable resistance and reactance are further denoted by "R" 164 and "jX" 166, respectively, while the cable impedance is expressed as "Z".

Based on the model circuit 100c, the active power "P" and reactive power "Q" injected into the grid can be expressed by equations (1) and (2), respectively. Equations (1) and (2) assume that the angles θ and φ are very small in most cases, and thereby sin(θ) is simply expressed as θ, while cos(θ) is expressed as a value of "1", and likewise for φ.

$$P = \frac{EV}{Z} - \frac{V^2}{Z} + \frac{EV}{Z}\theta\varphi \quad (1)$$

$$Q = \left(\frac{EV}{Z} - \frac{V^2}{Z}\right)\varphi - \frac{EV}{Z}\theta \quad (2)$$

Considering a typical 600V/1000V power cable for the secondary distribution grid 108—the resistance is normally in the range of 1.2 Ohm/km to 1.7 Ohm/km, whereas the reactance caused by the inductance at power frequency (50 Hz or 60 Hz) is only around 0.1 Ohm/km, which is less than 10% of the resistance. Therefore, the overall power cable can be considered resistive, which means "X" is 0 and φ=0 in equations (1) and (2), which leads to equations (3) and (4).

$$P = \frac{EV}{R} - \frac{V^2}{R} = \frac{V(E-V)}{R} \quad (3)$$

$$Q = -\frac{EV}{Z}\theta \quad (4)$$

In view of the foregoing, it will be appreciated that the active power "P" impacts the grid voltage "V", whereas the reactive power "Q" impacts the angle of the grid voltage, which can cause frequency deviation.

To date, attempts at mitigating the aforementioned problems resulting from increased penetration of single-phase active nodes in the distribution grid—e.g., imbalances in three-phase voltage power—have been largely deficient or ineffectual.

The first traditional approach has relied on the use of "voltage regulators" (VRs). A VR is a high-capacity autotransformer that is coupled on the primary side of the distribution grid (e.g., 106 in FIG. 1A), and operates to add or subtract voltage from the primary distribution in order to provide consistent system wide voltage levels. In some cases, VRs can function to increase the feeder voltage at the end of the feeder to make sure the voltage is in an acceptable range. However, owing to high costs, only a small number of VRs can be installed for each feeder line. Additionally, use of VRs is only effective when DER penetration level is low. With increasing numbers of DERs along the feeder, overvoltage—and therefore voltage imbalance issue—can appear even at the end of the feeder. Therefore, due to their passive nature, VRs are no longer effective for addressing voltage imbalance issues.

Another conventional approach involves the use of systems such as static synchronous compensators (STATCOMs), active power filters (APFs), as well as in-line power regulators (IPRs). These systems regulate the grid voltage via power control by injecting or absorbing reactive power. While voltages may be balanced to some extent by injecting or absorbing reactive power, power factor will also be affected, thereby leading to more energy losses. Further, as illustrated in FIG. 1C, a reactive power compensation approach alone is insufficient to address the voltage imbalance issue when DER and EV penetration levels are high. While some implementation schemes may be able to transfer a small portion of active power among the three phases, these implementation schemes still require reactive power to maintain system operation, thereby affecting the power factor of the grid. Some approaches have added interphase line-to-line power converters to provide additional power flow paths to balance the voltages. However, these solutions require connection to a three-phase point, which is not available in residential areas in North American grid designs. As well, these approaches are connected in line-to-line configuration, and thus are not applicable in the distribution system, making them inappropriate for addressing the voltage imbalance issue as the three phases are not decoupled.

Still yet another approach for addressing voltage imbalance issues is through the use of three-phase four-wire power converters based on shunt compensators. As the voltage of each phase can be independently controlled, the system is able to balance the three phase voltages to a great extent. However, these approaches are only applicable to locations where three-phase connections are available and cannot be used on demand side such as residential areas where only single phase is available. In addition, the systems are of little use in applications which use more than three phases (e.g., poly-phase systems). Still further, existing approaches are dedicated to compensators whose sole purpose is only to improve power quality.

In some cases, some solutions have relied on distributed single phase reactive power compensators that are positioned behind transformers to alleviate the problem by using volt-var control. However, in residential areas, the feeders are mostly resistive and injecting reactive power to the grid to address the overvoltage issue will result in reduced efficiency of the grid.

In view of the foregoing, embodiments herein provide for a method and system that at least partially address issues of voltage and power imbalance in three-phase, or higher poly-phase distribution grids. In at least one example application, the disclosed method and system may have practical application in mitigating power grid quality issues that result from increased penetration of DERs in various secondary distribution grids, as well as increased penetration of other single-phase active electric loads.

Figure 3A:
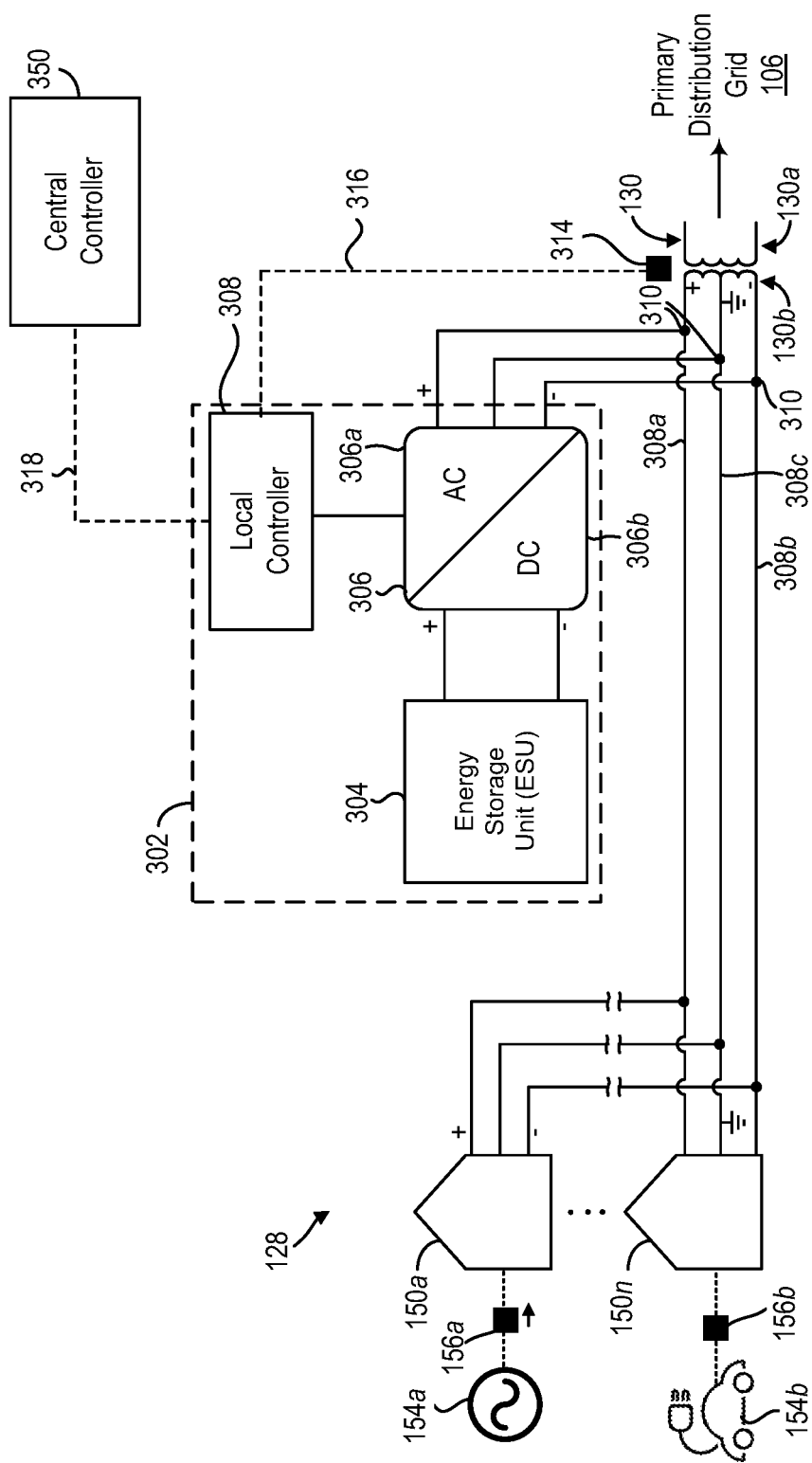
FIG. 3A shows an example illustration of a secondary grid block that includes a local balancing system, in accordance with embodiments provided herein.

Reference is now made to FIG. 3A, which shows an example illustration of a secondary grid block 128. In the illustrated embodiment, the secondary grid block 128 is connected to a local balancing system 302, in accordance with embodiments provided herein.

More specifically, the secondary grid block 128 includes a plurality of power consuming entities 150 (e.g., residential houses), which are connected to the distribution transformer 130 via feeders or distribution lines 308a-308c. Feeders 308 can carry single-phase AC power (e.g., 120 V/240 V AC power) and can include a positive voltage line 308a, a negative voltage line 308b and a neutral line 308c. Various single-phase active nodes 154 may be connected to the secondary grid block 128, including DERs 154a and EVs 154b.

To assist in overcoming grid-wide voltage imbalance issues, e.g., resulting from the increased connectedness of single-phase active nodes 154—the secondary grid block 128 may include a local single-phase balancing system 302 (also referred to herein as a local balancing system 302).

As shown, the local balancing system 302 may electrically couple to the secondary side 130b of the distribution transformer 130, via connection points 310. This is also illustrated in FIG. 1B, which shows the coupling of local balancing systems 302a-302c to secondary grid blocks 128. In at least some embodiments, the connection points 310 are located between the secondary transformer side 130b, and the power consuming entities 150.

As further illustrated, each local balancing system 302 generally includes a single-phase converter 306. The converter 306 is coupled, in turn, to an energy storage unit (ESU) 304 and a local controller 308. In some embodiments, the local balancing system 302 can include one or more sensors 314 (e.g., current and voltage sensors) that are also coupled to the local controller 308.

Single-phase converter 306 may convert between single-phase alternating current (AC) power and direct current (DC) power. The converter 306 may include an AC-side 306a and a DC-side 306b. The AC-side 306a is connected to the secondary side 120b of the distribution transformer 130 (e.g., via connection points 310), while the DC-side 306b connected to the energy storage unit (ESU) 304. As provided herein, the converter 306 can be controlled to draw single-phase AC power from the secondary grid block 128, and to convert the AC power into DC power. In some cases, the converted DC power is stored in the ESU 304. In other cases, converter 306 can convert DC power (e.g., stored in the ESU 304) into single-phase AC power, and the inject the single-phase AC power back into the secondary grid block 128.

Any suitable AC/DC converter topology known in the art may be used for the converter 306, and can include both single-stage and multi-stage designs. For example, the converter design can include full-bridge converters, multilevel converters, totem pole converters, current source converters, etc for a DC-AC stage. If necessary, a multi-stage converter 306 can further include a DC-DC stage coupled to the DC-AC stage, with the DC-DC stage comprising one or more boost converters, buck converters, buck-boost converters, high frequency isolated DC-DC converters, or other types of DC-DC converters. In some cases, the converter 306 may exclude the neutral line on the AC-side 306a without affecting operations.

Energy storage unit (ESU) 304 is any suitable device for storing and retaining direct current (DC) power. For example, ESU 304 can include one or more of batteries, super capacitors, or fuel cells, by way of non-limiting examples.

Sensors 314 may include, for example, voltage sensors as well as current sensors. In some embodiments, sensors 314 may generate sensor data (e.g., voltage and current data) that is communicated to the local controller 308 via a wired or wireless communication path 316. The sensor data may enable the local controller 308 to monitor state parameters of the secondary grid block 128, including the voltage, current and/or power in the secondary grid block 128. In at least one embodiment, the sensors 314 are positioned around the distribution transformer 130, e.g., at the secondary transformer side 130b.

Local controller 308 controls various aspects of the local balancing system 302. As explained in greater detail herein with reference to FIG. 10A, the local controller 308 can include a local controller (LC) processor 1002a coupled via a data bus 1010a to one or more of an LC communication interface 1004a, an LC memory 1006a and an LC input/output (I/O) interface 1008a.

In at least one embodiment, the local controller 308 can control operation of the converter 306. For example, local controller 308 may control the converter 306 to draw more single-phase AC power from the secondary grid block 128. The drawn single-phase AC power is then converted, by converter 306, into DC power. In other cases, local controller 308 may control the converter 306 to convert DC power into single-phase AC power. The single-phase AC power is then injected into the secondary grid block 128. The injecting or drawing of single-phase AC power from the secondary grid block 128 by converter 306 may be performed to increase or decrease the magnitude of the AC voltage in the block 128. As explained herein, this may facilitate balancing grid-wide single-phase voltages, as well as responding to increased power demand.

In some embodiments, the local controller 308 may, itself, communicate with a central (or global) controller 350. The communication can occur over a wired or wireless communication path 318. Central controller 350 may have global awareness of the operating state of various secondary grid blocks 128 (e.g., 128a-128c in FIG. 1B) in the secondary distribution grid 108. The global awareness may result from the central controller 350 receiving operating state data from each local controller 308 in respect of each corresponding secondary grid block 128. In view of this global awareness, the central controller 350 may monitor and detect system wide imbalances (e.g., voltage or power imbalances), and may respond by controlling specific local balancing system 302.

Figure 4A:
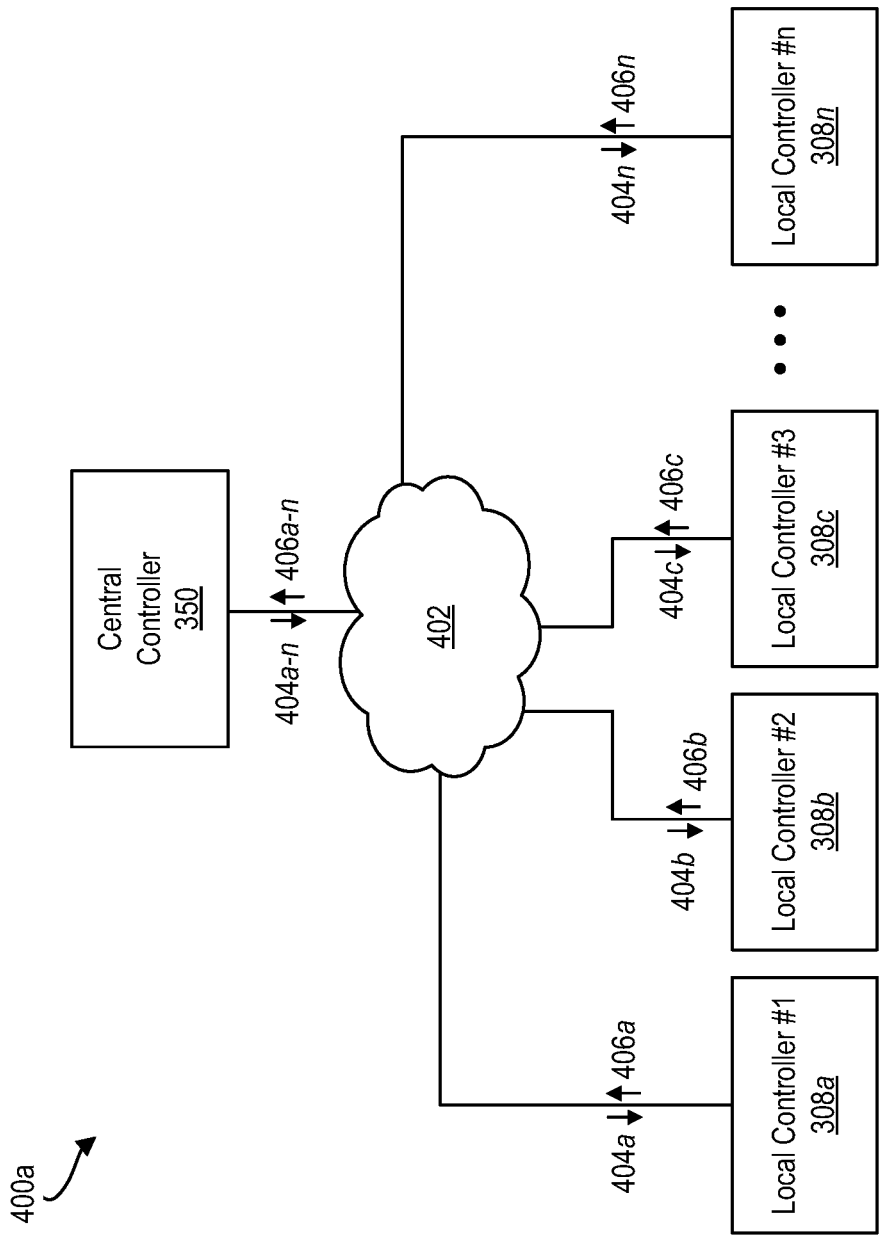
FIG. 4A shows a simplified block diagram of an example embodiment of a distribution grid control system, according to some embodiments.
Figure 4B:
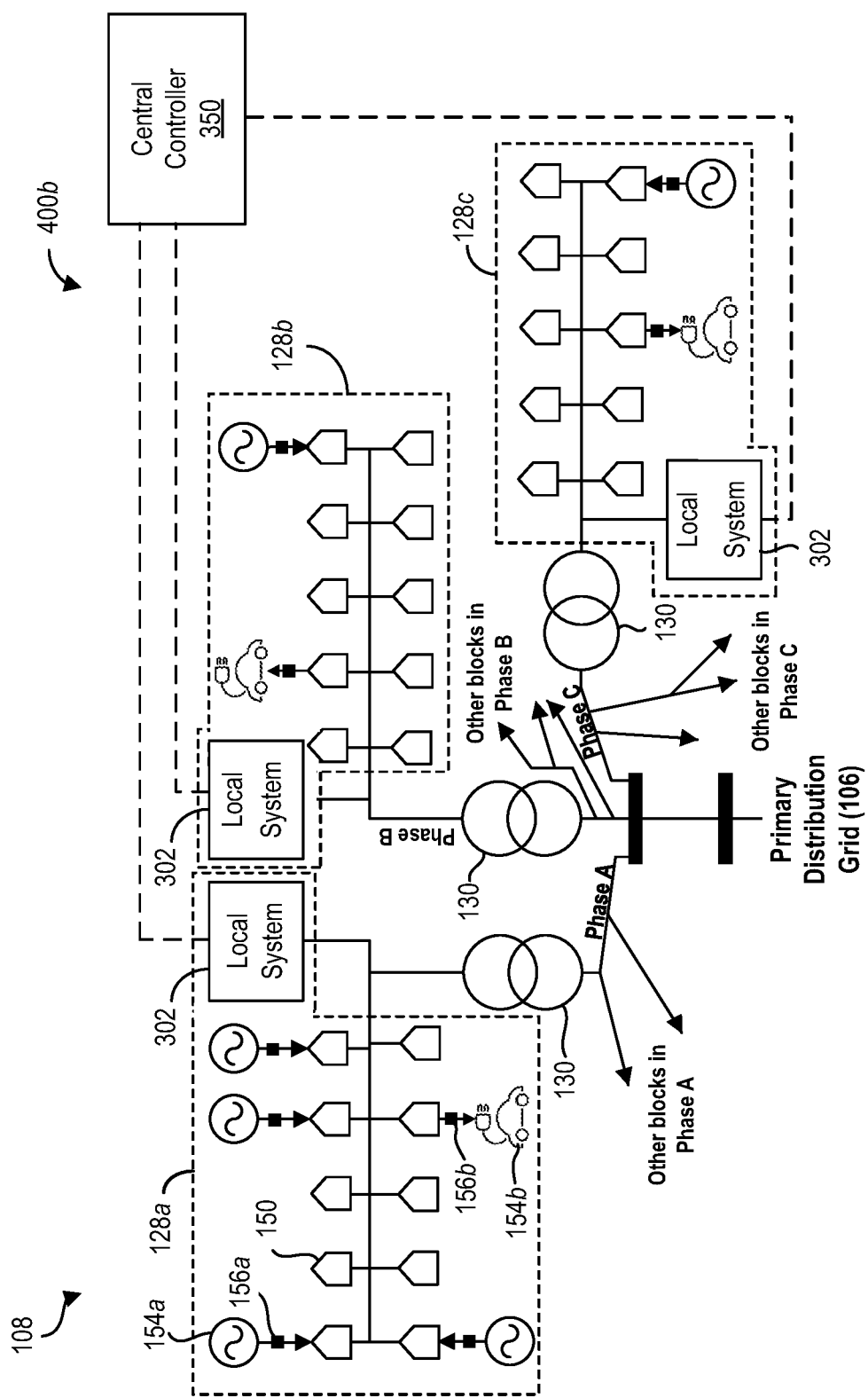
FIG. 4B shows an illustrative representation of the distribution grid control system of FIG. 4A.

Reference is now made concurrently to FIGS. 4A and 4B. FIG. 4A shows a simplified block diagram of an example embodiment of a secondary distribution grid control system 400a, according to some embodiments. FIG. 4B shows an illustrative representation 400b of the secondary distribution grid control system 400a of FIG. 4A.

As shown in FIG. 4A, the central controller 350 may communicate with one or more local controllers 308a-308n, via a network 402. Each local controller 308 may be associated with a separate local balancing system 302 servicing a separate secondary grid block 128 (e.g., as shown FIGS. 1B and 4B).

In some cases, a single local controller 308 may be associated with more than one block 128. For example, a single local controller 308 may communicate with converters 306 connected to different blocks 128. For instance, this may be possible where multiple blocks 128 are in close geographic proximity to each other (e.g., within 1 kilometer radius), such that they may be serviced by a common local controller 308. In other cases, it may be possible that multiple local controllers 308 are associated with the same secondary grid block 128, e.g., different controllers are performing different functions.

Central controller 350 may correspond to one or more servers (e.g., including cloud servers). As explained with reference to FIG. 10B, similar to local controllers 308, central controller 350 can include a central controller (CC) processor 1002b coupled, via a data bus 1010b, to one or more of a CC communication interface 1004b, a CC memory 1006b and a CC input/output (I/O) interface 1008b. In some embodiments, a central controller 350 may not be provided, and the local controllers 308 may simply communicate directly with each other via a distributed system architecture.

Network 402 can be a wireless and/or wired network. To this end, network 402 can be a service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the local controllers 308 and the central controller 350.

As shown, central controller 350 may generate and transmit control signals 404a-404n, via network 402, to each local controller 308 (also referred to herein interchangeably as controller-specific control signals or central control signals). The local controllers 308 can receive the respective control signals 404, and may control their respective local balancing systems 302 in accordance with operating control instructions included in the control signal 404.

In embodiment provided herein, the operating instructions, included in the control signals 404, can comprise voltage setpoints. The voltage setpoints can indicate target voltages for each secondary grid block 128 to achieve. To this end, a local controller 308 can receive a respective voltage setpoint, and can control the respective converter 306 to adjust the respective secondary grid block 128 voltage to substantially match the voltage setpoint. That is, the converter 306 is controlled to inject or draw single-phase AC power from the respective grid block in order to adjust the grid block voltage to match the voltage setpoint. In this manner, and as explained herein, the central controller 350 can use voltage setpoints to control voltages in different secondary blocks 128, thereby balancing the phase voltages across the secondary distribution grid 108.

In another embodiment provided herein, the operating instructions from the central controller 350 can include power limit instructions. Power limit instructions can indicate a maximum power flow into a secondary grid block 128. A local controller 308 can receive the power limit instruction, and can control the converter 306 to increase or decrease the respective power flow. This, in turn, can enable the central controller 350 to control the power demand across various secondary grid blocks 128, e.g., by reducing power flow to some secondary gird blocks 128.

Referring still to FIG. 4A, to assist the central controller 350 in generating control signals 404, each local controller 308 may transmit respective operating state signals 406a-406n to the central controller 350. Operating state signals 406 include operating state data in respect of a secondary grid block 128 associated with that local controller 308.

By way of non-limiting examples, the operating state signals 406 can include the magnitudes of the AC voltage, e.g., single-phase AC voltage, in each respective secondary grid block 128. This may be determined, for example, based on voltage sensor data received by a local controller 308 from a voltage sensor 314. The voltage sensor 314 may be positioned proximal to the secondary side 130b of the distribution transformer 130 to monitor the grid block voltage (FIG. 3A).

In other embodiments, the operating state signals 406 can include data about the magnitudes of AC currents in each secondary grid block 128. This may be determined, for example, based on current sensor data received from a current sensor 314, also located proximal the secondary transformer side 130b.

In still yet other embodiments, the operating state signals 406 can include power flow information (e.g., active power and/or reactive power data). In some cases, power flow is measured directly by specialized power sensors, as are known in the art (e.g., inductive sensors). In other cases, power flow is computed indirectly, by the local controller 308, based on measured voltage and current data, and in accordance with the model in FIG. 1C. In still other cases, the central controller may, itself, compute the power flow (e.g., based on the model in FIC. 1C), based on voltage and current data included in the operating state signal 406.

Operating state signals 406 may be generated and transmitted by each local controller 308 continuously, or at any pre-defined time or frequency intervals. In some cases, where an operating state signal 406 includes sensor data, the sensor data may be continuously received by a local controller 308—the local controller 308 can then transmit the sensor data in real-time or near real-time to the central controller 350. In other cases, sensor data may be received continuously, but the sensor data may be transmitted to the central controller 350 only at pre-defined time or frequency intervals (e.g., in batches every 5 minutes to 30 minutes).

In addition to the operating state data, operating state signals 406 may also include a unique identifier of the local controller 308 transmitting the operating signal 406. The identifier can identify the local controller 308 to the central controller 350. In this manner, the central controller 350 may associate the received operating state signal 406 with a corresponding local controller 308, i.e. and in turn, a secondary grid block 128.

In at least one embodiment, central controller 350 may store a database (e.g., a look-up table) that correlates different unique identifiers to known local controllers 308. This database may be stored, for example, on the controller's memory 1006b. The database may further correlate each local controller 308 to a secondary grid block 128 associated with that local controller 308. Accordingly, upon receiving an identifier in an operating state signal 406—the central controller 350 can reference the database to determine: (i) the local controller 308 associated with the received signal, e.g., based on the unique identifier; and (ii) the secondary grid block 128 associated with that local controller 308.

The database may also include geographic positioning data (e.g., GPS coordinate data) in respect of each secondary grid block 128. In this manner, if a local controller 308 reports a local fault, an automated system (or a human grid operator) can identify the geographic location of the secondary grid block 128, which is associated with that local controller 308. Remediating action may then be applied to that secondary grid block 128, e.g., a maintenance team may be dispatched to the block to mitigate the fault.

The database may also include information about which single-phase AC power is transmitted to each secondary grid block 128 (e.g., phase A, B or C)(e.g., FIG. 1B). This, in turn, enables the central controller 350 to determine, based on the operating state signal 406, how to control each secondary grid block 128 in order to best balance per-phase voltages or respond to power demands.

The operating state signal 406 can also include timestamp data. Timestamp data can indicate the time when operating state data, included in the signal, was collected or generated by sensors 314. For example, timestamp data can indicate that 01:13:51 AM, a voltage X was recorded in the grid block. If the signal includes a batch of multiple sensor data entries, e.g., collected over a period of time, then each sensor data entry may have its own corresponding timestamp.

In some cases, sensor data—collected over a time interval—can be combined into a single data entry. For example, multiple sensor data entries, collected over a window period of time (e.g., a 5 minute period), can be averaged into a single averaged value. The averaged value is then transmitted to the central controller 350. Accordingly, in these cases, the timestamp data may indicate the time interval over which the combined sensor data entries were collected.

As provided herein, timestamp data enables synchronizing multiple operating signals received from multiple local controllers 308. That is, the central controller 350 can reference timestamp data to determine the operating state, of each grid block, at each respective time instance. In at least some cases, each timestamp is generated by an internal clock of the local controller 308, which is synchronized with the internal clocks of other local controllers 308 and the central controller 350.

Figure 5A:
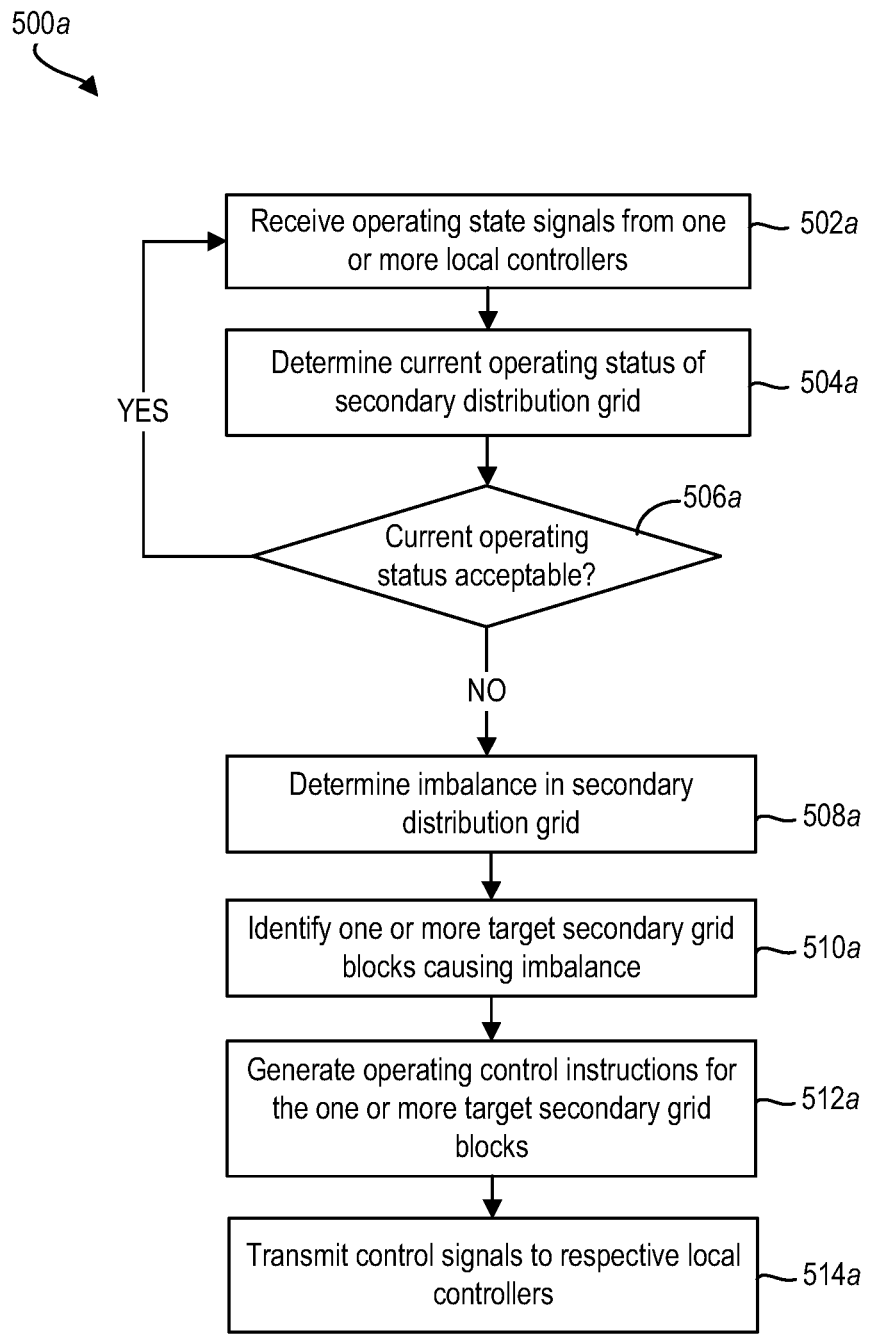
FIG. 5A shows an example embodiment of a method for real-time, or near real-time, balancing in a secondary distribution grid, and from the perspective of the central controller.
Figure 5B:
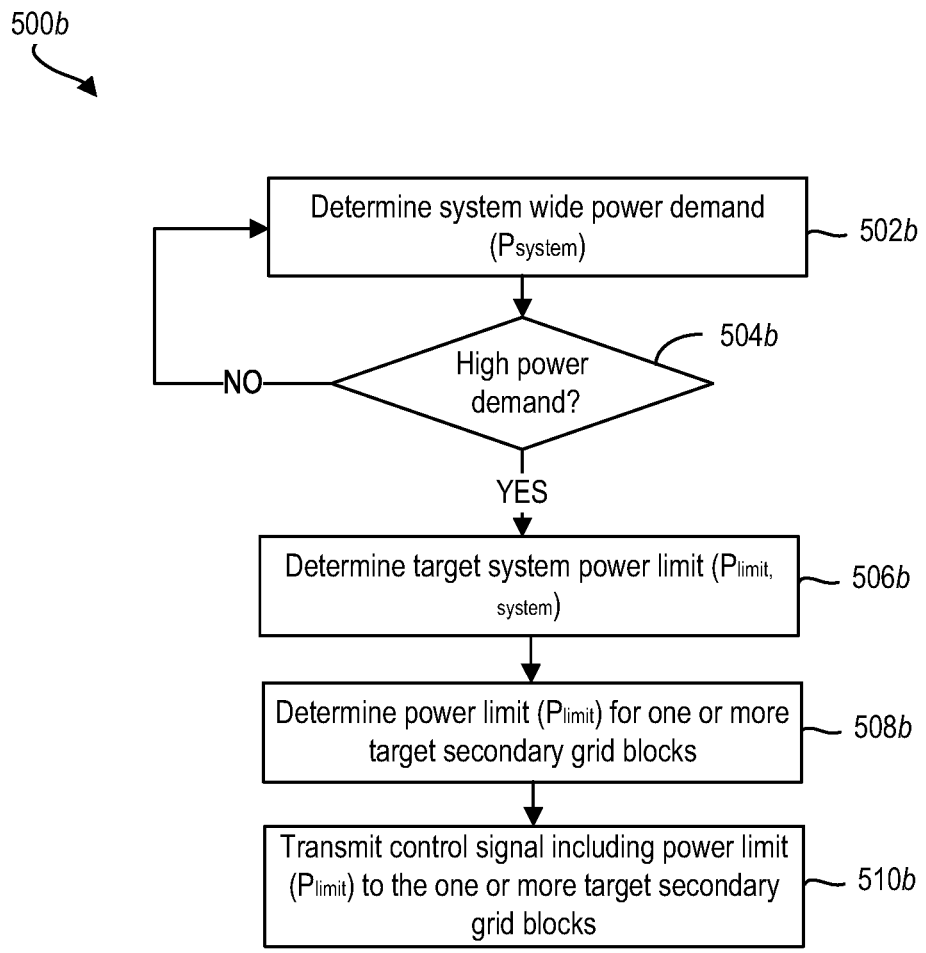
FIG. 5B shows a process flow for an example embodiment of a method for power balance control in a secondary distribution grid, and from the perspective of the central controller.
Figure 5C:
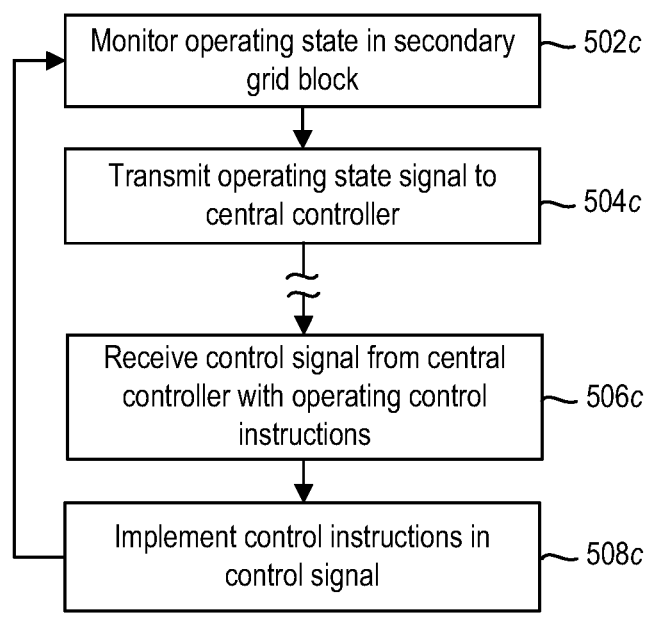
FIG. 5C shows an example embodiment of a method for real-time, or near real-time, balancing in a secondary distribution grid from the perspective of a local controller.
Figure 5D:
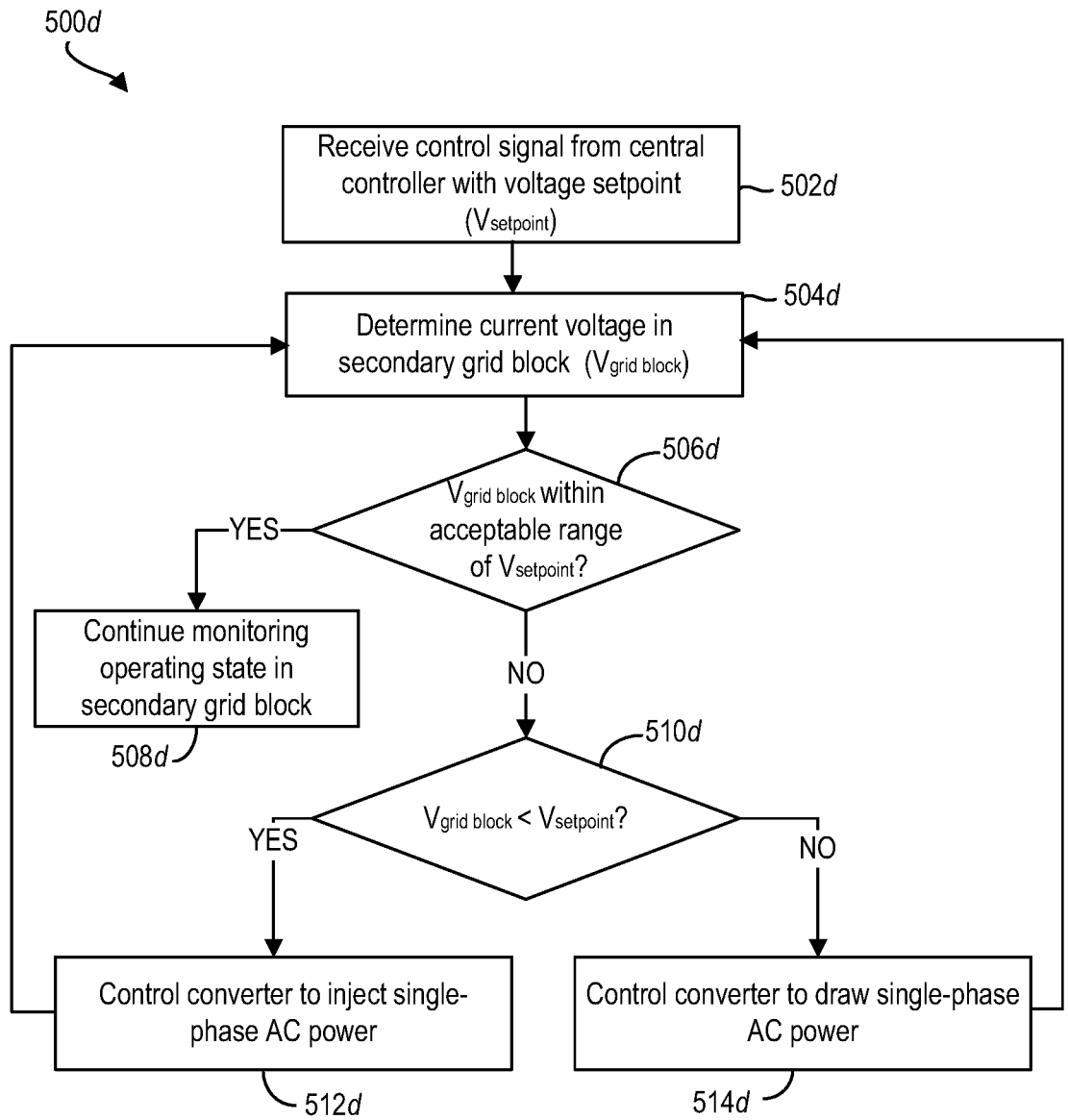
FIG. 5D shows an example embodiment of a method for real-time, or near real-time, voltage balancing in a secondary distribution grid from the perspective of a local controller.
Figure 5E:
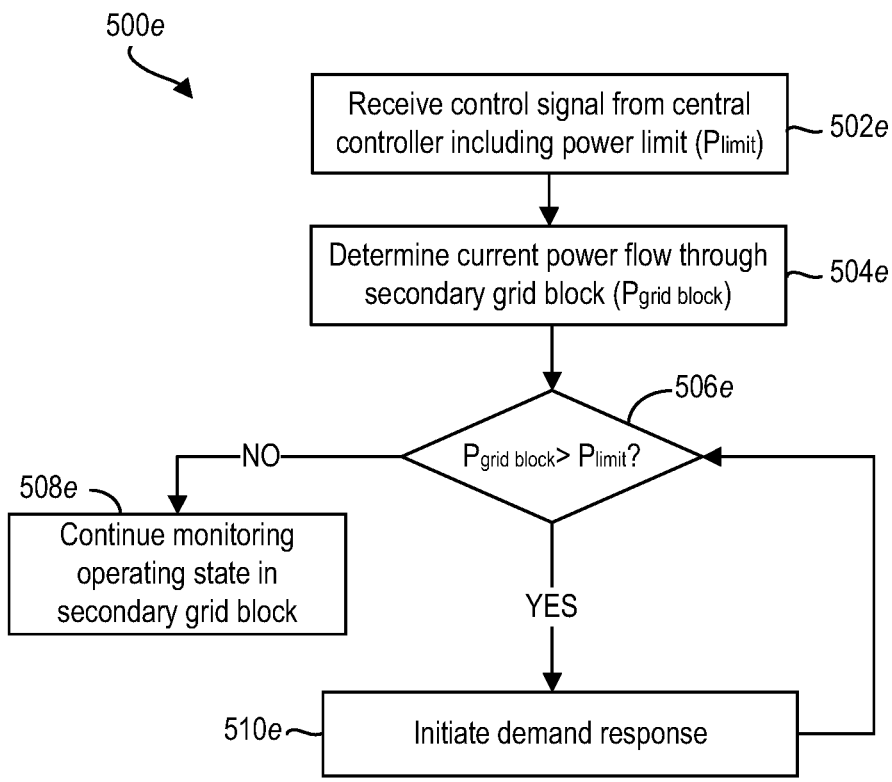
FIG. 5E shows a process flow for an example embodiment of a method for power balance control in a secondary grid block, and from the perspective of a local controller.
Figure 5F:
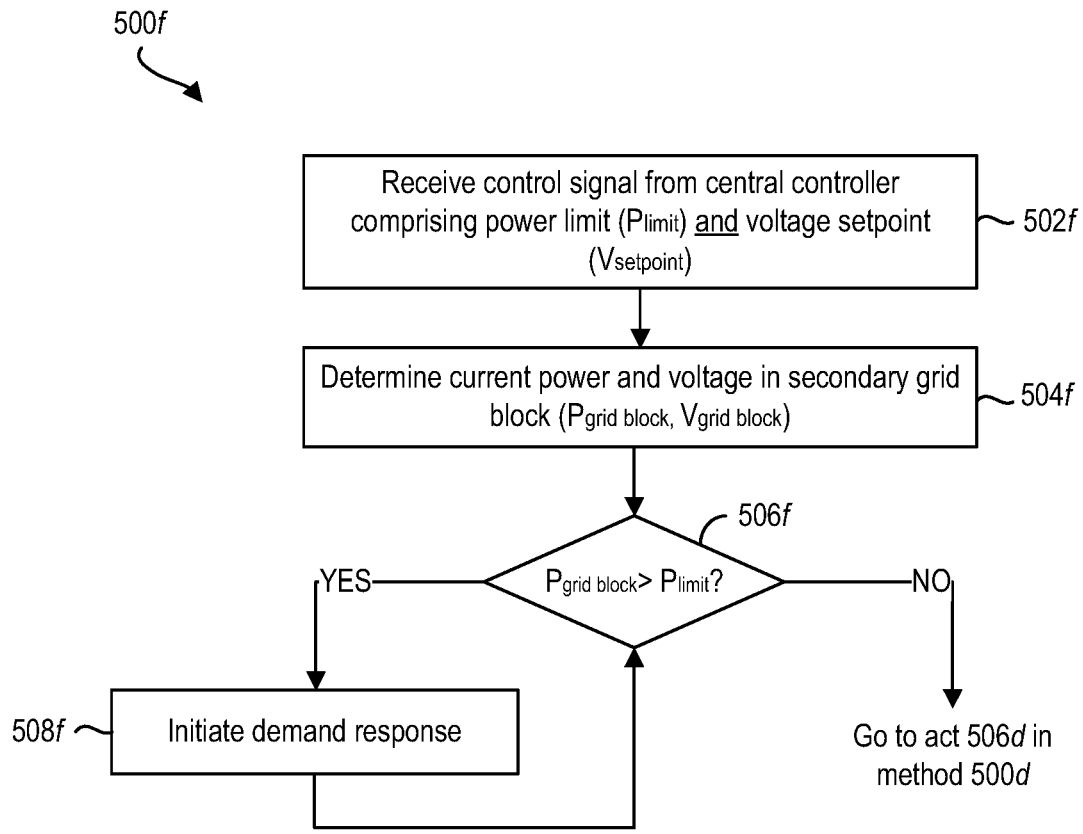
FIG. 5F shows a process flow for an example embodiment of a method for voltage and power regulation in a secondary grid block, and from the perspective of a local controller, according to some embodiments.

Reference is now made to FIGS. 5A to 5F which show various process flows for example embodiments of methods for real-time, or near real-time, balancing in an electrical distribution grid. FIGS. 5A-5C are process flows from the perspective of the central controller 350, while FIGS. 5D-5F are process flows from the perspective of a local controller 308.

Referring first to FIG. 5A, which shows an example embodiment of a method 500a for real-time, or near real-time, balancing in a secondary distribution grid, and from the perspective of the central controller 350. Method 500a may be performed, for example, by the processor 1002b of the central controller 350.

At 502a, the central controller 350 may receive operating state signals 406 from one or more local controllers 308. The operating signals 406 may include operating state data in respect of a corresponding secondary grid block 128, associated with that local controller (FIG. 4A).

The operating state data can include, for example, one or more of voltage data, current data and/or power data. As stated previously, this information may be generated by a local controller 308 using monitored sensor data from one or more sensors 314. The operating state signal may also include a unique identifier of the transmitting local controller. The operating state signal may also further include timestamp data, indicating the time instance when the voltage data, current data and/or power data was measured or received from a sensor. In at least some embodiments, operating state signals 406 may include real-time or near real-time data for each secondary grid block 128.

Central controller 350 can receive the operating state signals 406 continuously, or at pre-defined time or frequency intervals. If received at pre-defined time or frequency intervals, the operating signal 406 can include a batch of sensor data measurements collected from the last interval transmission and/or an average (or other combination) of the sensor data measurements collected from the last interval transmission. Operating state signals 406 may also be received from different local controllers 308 synchronously, or asynchronously.

In at least one embodiment, when an operating signal 406 is received from a local controller 308, the central controller 350 may: (i) initially determine the local controller 308 transmitting the operating signal 406. For example, this may be determined based on the unique identifier included in the operating signal 406 and with cross-reference to a stored database, as previously stated; and (ii) determine the secondary grid block 128 associated with that local controller 308. For example, this information may also be included in the stored database in the controller's memory 1004b (e.g., the look-up table can correlate specific local controllers 308 to corresponding secondary grid blocks 128). In this manner, the central controller 350 can associate different operating state data with different secondary grid blocks 128. In some cases, the central controller may also, (iii) determine the voltage phase (e.g., phase A, B or C) being delivered to the secondary block 128 transmitting the operating signal 406. For example, this information may be directly provided in the operating signal, or otherwise locatable in the stored database.

At 504a, based on the operating state data in the received operating signals 406, the central controller 350 can determine a current operating status for the secondary distribution grid 108.

In at least one embodiment, determining the current operating status of the grid 108 can comprise monitoring the individual voltages of each secondary gird block 128 and/or determining the total magnitude of each AC voltage phase in the grid 108 across all blocks 128 (also referred to herein as grid-wide phase voltages). In respect of the latter, in a three-phase grid, the central controller 350 may determine the grid-wide phase A voltage, phase B voltage and phase C voltage. This may enable the central controller 350 to determine if there is an imbalance between the total grid-wide phase voltages (e.g., as shown in FIG. 2B).

More particularly, the central controller 350 can: (i) initially, identify all operating state signals 406 carrying phase "A" voltage data. For example, as stated previously, the central controller 350 may rely on information contained in the operating state signal 406 to determine which operating data is associated with which AC phase voltage. In other cases, the central controller 350 can extract the identifier in the operating state signal 406, and can cross-reference the identifier to the stored database to determine which block 128 is receiving which AC voltage phase; (ii) subsequently, the central controller 350 can combine all phase "A" voltage data, received or generated at a given time instance, to determine the grid-wide phase "A" voltage, e.g., for that time instance. For example, the controller 350 may use timestamped data—extracted from each operating signal 406—to ensure that the controller is only combining phase "A" data having a common timestamp. The central controller 350 can then perform the same routine to determine the grid-wide phase B and C voltages at the given time instance. In some cases, the combining may involve averaging all received phase "A" voltage data to determine the grid-wide phase "A" voltage, averaging all received phase "B" voltage data to determine the grid-wide phase "B" voltage and averaging all received phase "C" voltage data to determine the grid-wide phase "C" voltage.

In another embodiment, determining the current operating status of the grid at 504a can involve tracking the cumulative power flow in the secondary grid 108 and/or the power in individual secondary grid blocks 128 over time. The power flow in each block 128 can be determined based on power information included in each operating signal 406. The power flow in each block 128 can also be determined in-directly based on voltage and current data received in each operating signal 406. In some cases, the cumulative grid-wide power flow may be determined by combining (e.g., averaging) the power flow data received from each secondary gird block 128 at a given time instance, e.g., in a manner similar to determining the total grid-wide phase voltages.

In general, the central controller 350 can use the power flow information to determine whether power demand is relatively uniform among different secondary grid blocks 128, whether some grid blocks 128 have higher power demand than other grid blocks 128 and/or whether the overall total power demand is too high.

The operating status, at 506*a*, may be determined for a given instance in time. This may be determined continuously, or at pre-defined time or frequency intervals. In other cases, the operating status may be determined over a windowed time period range, e.g., a moving time window. For example, the operating status may be determined as the average operating status over the duration of the windowed time period.

At 506*a*, the central controller 350 can determine whether the current operating status of the grid is acceptable or satisfactory.

In at least one embodiment, act 506*a* can involve determining whether the grid-wide phase voltages (e.g., determined at 504*a*), are within an acceptable range. For example, this can include determining whether, each individual grid-wide single-phase voltage, is within an acceptable range of a target voltage (e.g., ±0.5%). Additionally, or in the alternative, central controller 350 may also determine whether the difference between the three (or more) grid-wide single-phase voltages is also within a pre-determined acceptable range, e.g. less than 0.5% (e.g., as shown in plot 200*a* of FIG. 2A).

If the single-phase voltages are not within an acceptable range, then the central controller 350 can determine the presence of a voltage imbalance in the secondary distribution grid 108 (e.g., as shown in plot 200*b* of FIG. 2B). In some cases, this imbalance may result when there are too many activated DERs or electric loads in blocks 128 associated with a specific single-phase voltage. For example, in FIG. 1B, if secondary grid blocks 128*a* includes an excess of activated DERs 154*a*, e.g., solar cells, this can cause an increase in the magnitude of the phase "A" voltage, thereby unbalancing the voltages. In contrast, if secondary blocks 128*b* include an excess of activated single-phase loads 154*b*, such as charging electric vehicles, this can cause a reduction in the magnitude of the phase "B" voltage.

In another embodiment, act 506*a* can involve determining whether the total power demand in the secondary distribution grid 128 is too high. This can be determined based on the cumulative power flow data determined at act 504*a*. For example, the central controller 350 can determine whether current power demand is above a pre-determined target power demand (e.g., above 0.5% of the target power demand).

If it is determined at act 506*a* that the operating status of the secondary grid 108 is acceptable, then method 500*a* may return to act 502*a* to continue receiving operating state signals 406 from local controllers 308.

Alternatively, if it is determined at act 506*a* that the operating status is not acceptable (e.g., a voltage imbalance or a high power demand), then at 508*a*, the central controller 350 can determine an imbalance in the operating status of the secondary grid 108.

At 510*a*, the central controller 350 can identify one or more target secondary grid blocks 128 that are causing the identified imbalance. As explained herein, the central controller 350 may attempt to correct the operation of the target secondary blocks 128 to mitigate the imbalance.

If the imbalance is a voltage imbalance, then at 510*a*, the central controller 350 can identify one or more target blocks 128 that are responsible for causing the voltage imbalance. For example, this may involve, (i) initially, identifying the grid voltage phase that is not within the acceptable range (e.g., phase A, B or C); and (ii) subsequently, identifying all secondary grid block 128 that are receiving the imbalanced grid phase voltage as being the problematic blocks.

In other cases, rather than identifying all blocks 128 receiving the imbalanced voltage phase as being problematic—the central controller 350 can identify only specific blocks 128, that are receiving the phase voltage, that are responsible for causing the imbalance.

For example, for a given imbalanced phase voltage, the central controller 350 can determine that specific blocks 128 have higher or lower than normal voltages, and in turn, are responsible for causing the imbalance in the phase voltage. In some cases, determining which secondary blocks 128 are responsible for the imbalance is based on the voltage data from the received operating signals 404. For instance, the central controller 350 may identify that some blocks have excessively higher or lower voltages than other blocks, and thereby cause the voltage imbalance in a given voltage phase. In some cases, the central controller 350 can store pre-defined maximum and/or minimum threshold values for secondary grid block voltages. Blocks 128 having voltages that are not within the acceptable maximum/minimum range may be identified as the problematic blocks.

In another example, at 510*a*, rather than a voltage imbalance—the imbalance may be result of high power demand. In these cases, the central controller 350 can identify target secondary grid blocks 128 that demonstrate high power demand, e.g., based on power flow information. This may also be determined by identifying blocks that have power demand not within an acceptable range.

At 512*a*, operating control instructions can be determined for each target secondary grid block 128 identified at 510*a*. Operating control instructions can include commands to be implemented by the local controllers 308 associated with the target blocks 128. The operating control instructions can assist in mitigating the imbalance in the secondary grid.

As discussed previously, the operating control instructions can comprise voltage setpoints for the local controllers 308. For example, if a voltage imbalance is caused by a high phase voltage (e.g., a high phase A, B or C voltage)—the central controller 350 can determine voltage setpoints that lower the respective phase voltage in each target secondary grid block 128. Accordingly, the local controllers 308— receiving the operating control instruction, and associated with the target blocks 128—can lower the voltage to the voltage setpoint. In contrast, if a voltage imbalance is caused by a low voltage phase, the central controller 350 can determine voltage setpoints that increase the phase voltage in the target secondary grid blocks 128. In some cases, the voltage setpoints can be determined based on the voltage drifting trend of each phase and each grid block.

In another example, if the imbalance is a power imbalance (e.g., caused by high power demand)—the operating control instructions can comprise a power limit for limiting the power flow through a target secondary block 128. A local controller 308 may receive the power limit instructions, and in response, can limit power flow through the associated secondary block 128. In limiting the power flow, the energy consumption is in turn reduced, thereby mitigating the high power demand.

In some cases, the operating control instructions may vary for different target secondary grid blocks 128. For example, the central controller 350 may determine that some secondary blocks 128 are larger contributors to an imbalance than other blocks. Accordingly, the central controller 350 can sort the responsible blocks based on the extent of their contribution to the imbalance, and in turn, generate appropriate setpoints. For example, for a high voltage imbalance—target secondary blocks 128 having the highest voltage will receive a lower setpoint than blocks having relatively lower voltage.

At 514a, the central controller 350 can generate and transmit control signals 404 to local controllers 308 that are associated with the target secondary grid blocks 128. The control signals can include operating control instructions, including the voltage setpoints and/or power limit instructions determined at 512a. In this manner, the central controller 350 is able to mitigate for imbalances in the secondary distribution grid.

In some cases, method 500a may be adapted for individual secondary grid blocks 128 rather than for the entire secondary grid. This may allow for micro management of secondary blocks 128, as contrasted to macro management of the entire secondary grid (as described above).

For example, at 504a, central controller 350 can determine the operating status of a single secondary grid block 128, rather than the entire grid 108 (e.g., based on the received operating state signal at 502a). At 506a, the controller 350 can determine whether the operating status—e.g., the voltage and/or power flow—is within an acceptable range (e.g., below a maximum operating status and above a minimum operating status). This acceptable range may be referenced herein as a block-level operating status range, as opposed to a grid-wide operating status range as shown in current 506a. If the operating status is not within that range, then at 508a and 510a, an imbalance may be detected for that grid block 128, and an operating control signal may be generated and transmitted at 512a and 514a to the grid block's local controller 308. In this manner, even where the grid-wide operating status is within an acceptable range—the central controller 350 can also individually manage individual secondary blocks 128 to adjust their operating status if they are in an abnormal range In some cases, the central controller 350 may perform both concurrent macro-management of the entire grid (as shown in FIG. 5A), as well as micro-management of individual secondary grid blocks 128 (as described above).

Reference is now made to FIG. 5B, which shows a process flow for an example embodiment of a method 500b for power balance control in a secondary distribution grid, and from the perspective of the central controller 350. Method 500b is an example application of method 500a, where the central controller 350 is mitigating specifically for a power demand imbalance (e.g., as opposed to voltage imbalance). Method 500b may be executed, for example, by the processor 1002b of the central controller 350.

At 502b, the central controller 350 can determine the system wide power demand ($P_{system}$) in the secondary distribution grid. Act 502b may be executed during act 504a of method 500a.

In some cases, the determination at 502b may be performed based on power flow information included in operating state signals 406 received from various local controllers 308, e.g., associated with different secondary grid blocks 128. Otherwise, the central controller 350 can itself determine (e.g., compute) the power flow information in each secondary grid block 128 based on voltage and current data in received operating state signals 406. In either case, the controller 350 may determine the system wide power demand ($P_{system}$) by summing up the power demand of individual secondary grid blocks 128.

At 504b, the central controller 350 can determine if the system wide power demand, at a given time instance or time interval, is too high. For example, the central controller 350 can determine if the system wide power demand ($P_{system}$) is greater than a pre-determined threshold. In various cases, act 504b may be executed during act 506a of method 500a.

At 506b, the central controller 350 can determine a target system wide power limit ($P_{limit, system}$). In various cases, this may be the same as the threshold used at 504b.

At 508b, the central controller 350 can determine a power limit ($P_{limit}$) for one or more target secondary grid blocks to realize the target system power limit ($P_{limit, system}$).

In some cases, the target system power limit ($P_{limit, system}$) can be evenly distributed between the various target secondary grid blocks 128. For example if the overall power demand is $P_{system}$ in the entire system (e.g., as determined at 502b), and the target power limit is $P_{lim,system}$, and further the current power through a given distribution transformer i is $P_{transformer,i}$, the power limit ($P_{limit}$) for transformer i will be determined by a proportionate equation of $P_{transformer,i} * (P_{limit,system}/P_{system})$.

At 510b, based on the determination at 508b, the central controller 350 can generate and transmit control signals that include power limits ($P_{limit}$) for the one or more target secondary grid blocks.

In at least some embodiments, acts 506b-508b may be performed during execution of act 512a in method 500a, while act 510b can be performed during execution of act 514a in method 500a.

Reference is now made to FIG. 5C, which shows an example embodiment of a method 500c for real-time, or near real-time, balancing in a secondary distribution grid from the perspective of a local controller 308. Method 500c may be performed, for example, by the processor 1002a of a local controller 308.

At 502c, the local controller 302 can monitor the operating state in a corresponding secondary grid block 128 (e.g., FIG. 3A). The monitored operating state can include, for example, monitored voltage, current and/or power flow. This may be monitored based on sensor data received from one or more sensors 314 proximal the secondary transformer side 130b. As mentioned earlier, the operating state may be monitored continuously, or at pre-defined time and/or frequency intervals.

At 504c, the local controller 308 may transmit an operating state signal 406 to the central controller 350 (e.g., FIG. 4A). The operating state signal 406 can include monitored operating state data. In some cases, the operating state signal 406 can also include the unique identifier which identifies the local controller 308 to the central controller 350. In still some other cases, the operating state signal 406 can include information about the specific phase voltage being received by a corresponding secondary grid block 128 (i.e. phase A, B or C).

At 506c, at a subsequent point in time, the local controller 308 may receive a control signal 404 from the central controller 350. The control signal 404 can include, for example, operating control instructions such as a voltage setpoint. The control signal 404 may be generated in accordance with method 500a in FIG. 5A. In other cases, the control signal 404 can also include power limit instructions ($P_{limit}$) generated in accordance with method 500b in FIG. 5B.

At 508c, the local controller 308 can implement the control instructions included in the control signal. For example, as explained with reference to FIGS. 5D-5F, the local controller 308 can control the converter 306 to draw or inject single-phase AC from the secondary grid block 128 to increase or decrease the voltage, or decrease the power demand.

Reference is now made to FIG. 5D, which shows an example embodiment of a method 500d for real-time, or near real-time, voltage balancing in a secondary distribution grid from the perspective of a local controller 308. Method 500d may be considered as an example application of method 500c of FIG. 5C in which the control instruction, received from the central controller 350, includes a voltage setpoint. Method 500d may be performed, for example, by the processor 1002a of a local controller 308.

As shown, at 502d, the local controller 308 may receive a control signal 404 from the central controller 350 including a voltage setpoint ($V_{setpoint}$). Act 502d is analogous to act 506c in method 500c.

At 504d, the local controller 308 may identify the current voltage in the secondary grid block ($V_{grid\ block}$). In some case, the current voltage ($V_{grid\ block}$) may correspond to the instantaneous voltage. In other cases, the current voltage ($V_{grid\ block}$) may correspond to the average voltage over a moving time window (e.g., the last 5 seconds, or 15 minutes of time). In some example cases, the local controller 308 can measure the current voltage in the secondary grid block 128 (e.g., via voltage sensors 314).

At 506d, the local controller 308 can determine whether the secondary grid block voltage ($V_{grid\ block}$) is within an acceptable pre-defined range of the voltage setpoint ($V_{setpoint}$). In at least one embodiment, the pre-determined range can be within about 1% to 2% of the voltage setpoint ($V_{setpoint}$). In various cases, the pre-determined range can be set by an operator based on the characteristics of the secondary grid portion 128 in certain geographical areas.

If the secondary grid block voltage ($V_{grid\ block}$) is within the acceptable pre-defined range of the voltage setpoint ($V_{setpoint}$), then the controller may simply continue monitoring the operating state of the secondary grid block at 508d (e.g., analogous to act 502c in method 500c). Otherwise, if the secondary grid block voltage ($V_{grid\ block}$) is not within the acceptable pre-defined range, then at act 510d, the local controller 308 can determine whether the secondary grid block voltage ($V_{grid\ block}$) is less than the voltage setpoint ($V_{setpoint}$).

If the secondary grid block voltage ($V_{grid\ block}$) is less than the voltage setpoint ($V_{setpoint}$), this may be a result of large power demand from single-phase electric loads 154b, connected to the corresponding secondary grid block 128 e.g., electric vehicles being charged.

Accordingly, to increase the voltage in the secondary grid block 128 to the voltage setpoint ($V_{setpoint}$), at 512d, the local controller 308 can control the respective power converter 306 (FIG. 3A) to inject single-phase AC power into the secondary grid block 128. For example, the power converter 306 (FIG. 3A) can convert stored DC power in the ESU 304 into single-phase AC power, which is injected into the secondary grid block 128 to compensate for any voltage reduction.

Alternatively, if the secondary grid block voltage ($V_{grid\ block}$) is greater than the voltage setpoint ($V_{setpoint}$), this may be a result of excessive electric power generation from single-phase electric sources 154a, e.g., solar panels.

Accordingly, to decrease the voltage in the secondary grid block 128 to the voltage setpoint ($V_{setpoint}$), at 514d, the local controller 308 can control the respective power converter 306 to draw single-phase AC power from the secondary grid block 128 as to decrease the single-phase voltage to the voltage setpoint ($V_{setpoint}$). For example, the power converter 306 can convert single-phase AC power, in the secondary grid block 128, into DC power that can be stored in the ESU 304.

Following 512d or 514d, method 500d can return to act 504d to once again determine the secondary grid block voltage ($V_{grid\ block}$). Acts 504b to 514d may then iterate until the determination at 506d is positive (e.g., true).

In some cases, the local controller 308 may be operable to control the power converter 306 to inject reactive power in order to adjust the voltage in the secondary grid block 128 to the voltage setpoint. For example, the converter 306 may be controlled to generate a mismatch between the phase of the injected voltage and current to generate reactive power, as needed.

In various cases, acts 504d-514d in method 500d may be performed during act 508c of method 500c.

Reference is now made to FIG. 5E, which shows a process flow for an example embodiment of a method 500e for power balance control in a secondary grid block, and from the perspective of a local controller. Method 500e may be considered to be another example application of method 500c of FIG. 5C in which the control instruction, received from the central controller 350, includes a power limit. Method 500e may be performed, for example, by the processor 1002a of a local controller 308.

At 502e, the local controller 308 can receive a control signal from the central controller 350. The control signal can include a power limit command ($P_{limit}$) in respect of a maximum allowed power flow through the distribution transformer 130. In some embodiments, the power limit ($P_{limit}$) can simple match the maximum rating of the distribution transformer 130. Act 502e is analogous to act 504c in method 500c.

At 504e, the local controller 308 can determine the current power flow through the secondary grid block ($P_{grid\ block}$). For example, this can correspond to the determined power flow through the respective distribution transformer 130.

At 506e, the local controller 308 can determine whether the current power flow through the secondary grid block ($P_{grid\ block}$) is greater than the power limit ($P_{limit}$).

If the current power flow through the secondary grid block ($P_{grid\ block}$) is not greater than the power limit ($P_{limit}$), then at 508e, then the controller may simply continue monitoring the operating state of the secondary grid block 128 (e.g., analogous to act 502c in method 500c).

Otherwise, at 510e, the local controller 308 can initiate a demand response. In at least one embodiment, the demand response can involve controlling the converter 306 to inject more single-phase AC power into the secondary distribution grid 128 (e.g., by converting power stored in the ESU 304). The injected single-phase AC power can offset the increased demand in the secondary grid block 128. Method 500e may then iterate between acts 506e and 510e until the power limit ($P_{limit}$) is realized.

Reference is now made to FIG. 5F, which shows a process flow for an example embodiment of a method 500f for voltage and power regulation in a secondary grid block, according to some embodiments. Method 500f represents a combination of methods 500d and 500e. Method 500f may be executed, for example, by a processor 1002a of a local controller 308.

At 502f, the local controller 308 can receive a control signal 406 from a central controller 350. The control signal 306 can include operating control instruction that include both the power limit ($P_{limit}$), as well as the voltage setpoint ($V_{setpoint}$).

At 504f, the local controller 308 can determine the current voltage in the secondary grid block ($V_{grid\ block}$), as well as the current power flow through the secondary grid block ($P_{grid\ block}$), e.g., in a manner analogous to acts 504d and 504e, respectively. Acts 506f to 508f are then generally analogous to acts 506e and 510e in method 500e of FIG. 5E in that the local controller 308 initially compares the power limit ($P_{limit}$) to the current secondary grid block power ($P_{grid\ block}$) to determine whether to initiate a demand response at act 508e. If the current secondary grid block power ($P_{grid\ block}$) is determined not to be greater than the power limit ($P_{limit}$), then the method 500f may proceed to act 506d of method 500d.

In method 500f, the comparison of the secondary grid block power ($P_{grid\ block}$) to the power limit ($P_{limit}$) may have the greater priority over the comparison of the voltage setpoint ($V_{setpoint}$) to the voltage in the secondary distribution block ($V_{grid\ block}$) as the demand response may only last for short periods, while the voltage normally will not change significantly as long as the peak demand is within a reasonable range.

Figure 6:
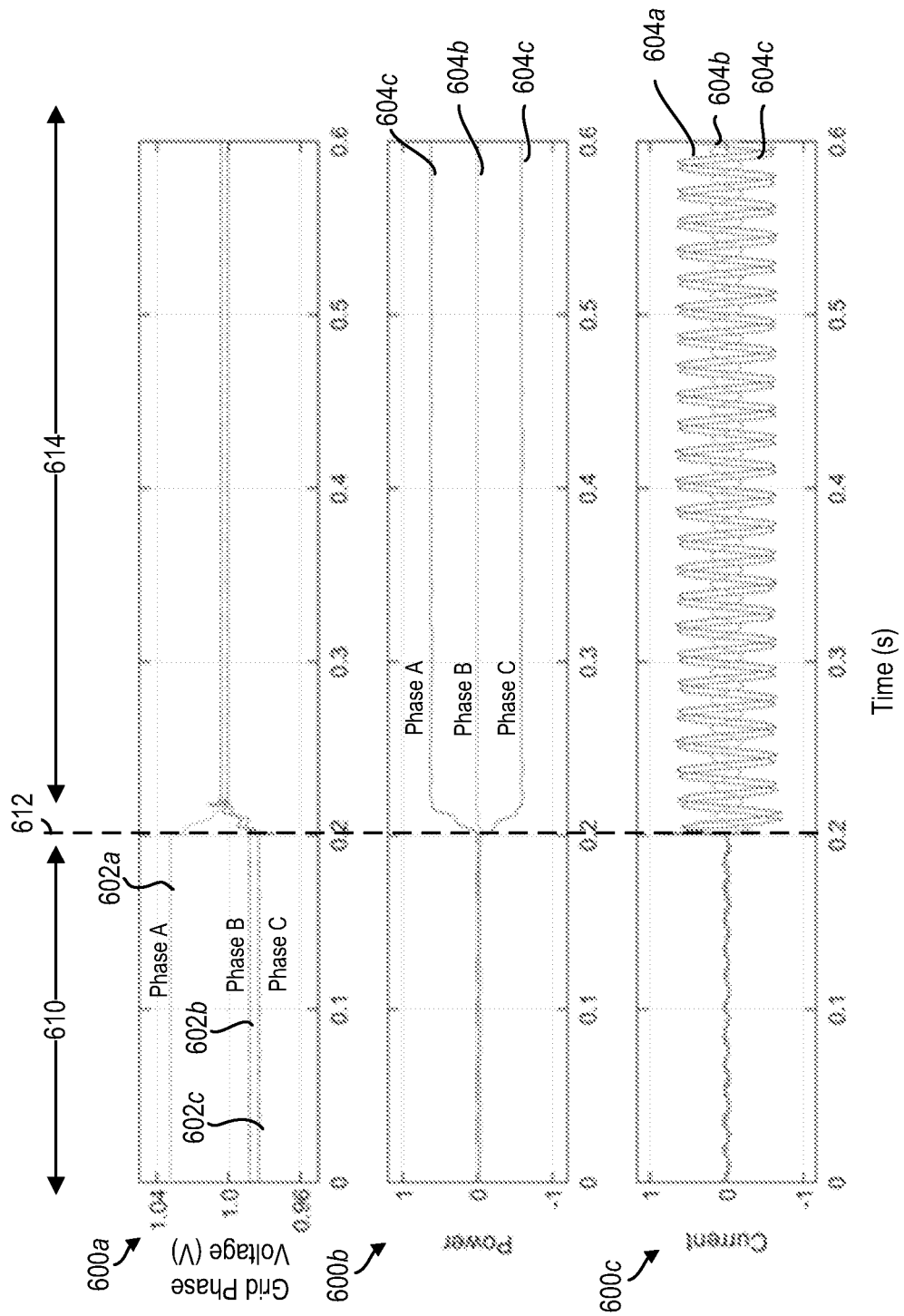
FIG. 6 shows example simulated plots that can result from the methods of FIGS. 5A to 5F.

Reference is now made to FIG. 6, which illustrates example simulated plots 600a-600c that can result from the balancing in FIG. 5A to FIG. 5F.

Plot 600a shows example three-phase grid voltages (e.g., phase "A" 602a, phase "B" 602b, and phase "C" 602c) as a function of time (seconds). As shown, during time period 610, before the voltage balancing is activated in methods 500a to 500f, the voltage magnitudes between the three phases is imbalanced. In particular, there is a significant difference between the voltage of phase "A" as compared to phases "B" and "C".

In response to the detected voltage imbalance, at time 612, methods 500a to 500f are executed. In turn, the central controller 350 can control the various local balancing systems 302 to correct for the voltage imbalance. As a result, as shown in plot 600a, in time range 614, the voltages in each grid phase are balanced and are of generally equal magnitude.

Plot 600b illustrates power from the three different local balancing systems 302 for each voltage phase. Plot 600c illustrates the currents from the three different local balancing systems 302. In plots 600b and 500c, consequent to activating the local balancing systems 302, the three phase grid powers and currents are different so as to balance their respective grid voltages. To this end, by injecting or absorbing different amount of power, the voltages are balanced.

In view of the foregoing, several advantages of the above described system and method can be appreciated.

First, as each local balancing system 302 is placed behind the respective distribution transformer 130 (e.g., on the secondary side 130b), each local balancing system 302 only manages its own secondary grid block 128 after the distribution transformer 130. In particular, as compared to existing methods used in the primary grid 106, the disclosed local balancing systems 302 are able to regulate their respective feeder voltages without affecting other blocks 128 of the secondary grid 108, thereby making grid management more flexible.

Further, by placing the local balancing system 302 behind the distribution transformer 130, the control complexity is reduced as each local balancing system 302 is only responsible for managing a single AC phase (e.g., rather than multiple phases in the primary grid 106).

Additionally, placement of the local balancing systems 302 behind the distribution transformers 130 allows for more manageable balancing as the voltages are lower behind the distribution transformer 130 than in front of the transformer 130 (e.g., in the primary distribution grid 106). For example, a smaller and simpler converter 306 can be used with the lower voltages behind the distribution transformer 130. Installing the local balancing systems 302 behind the distribution transformers 310 can also better prevent overloading the transformers 130 due, for example, to charging of EVs.

Another appreciated advantage of the disclosed distribution grid control system is that it may be applied to a poly-phase electric grid. That is, methods 500a to 500f can be used to balance any number of phases in an electric distribution grid, and are not limited to only three-phase grids, e.g., as the case may be for conventional designs. Further, as compared to existing designs, the disclosed local balancing systems 302 are able not only to regulate reactive power, but are also able to regulate active power in the secondary side of the distribution system using an active power source or sink (e.g., ESU 304) (see e.g., FIG. 1C).

Still further, the modular and distributed nature of the disclosed local balancing systems 302 allow the local balancing systems 302 to be quickly installed at various secondary grid block locations 128, e.g., behind the respective distribution transformer 130, and coupled to a central controller 350 to rapidly address balance issues in the distribution grid. As well, the use of a central controller 350 allows for coordinated grid-wide balancing by remotely controlling various distributed local balancing systems 302.

In at least one embodiment, due to the modular nature of the single phase design of each local balancing system 302, multiple local systems 302 may also be paralleled and connected to a multi-phase point. For example, referring to FIGS. 3B and 3C, which show example designs 300b and 300c whereby multiple local balancing systems 302a-302c are connected in parallel to form a three-phase compensator sharing a common ESU 304. In this example case, the local controllers 308 of the paralleled SPESUs can be coordinated or simply work independently. In a coordinated control, the local controllers 308 can communicate with each other, especially when they share the same ESUs.

Each local balancing system 302 may have a DC connection terminal through which the DC side, e.g. the ESU 304, of the paralleled local balancing system 302 can be connected to achieve a more balanced ESU 304 usage if isolation between the local balancing systems 302 is available. Such isolation can be realized via either line-frequency transformer at the AC side (FIG. 3B) or a high frequency transformer (FIG. 3C) as part of the power converter 306. In some example cases, the designs 300b and 300c can be used at a three-phase connection points typically found in European distribution grid designs. In various cases, more local balancing systems 302 can be paralleled if the system has a higher number of phases.

Figure 3B:
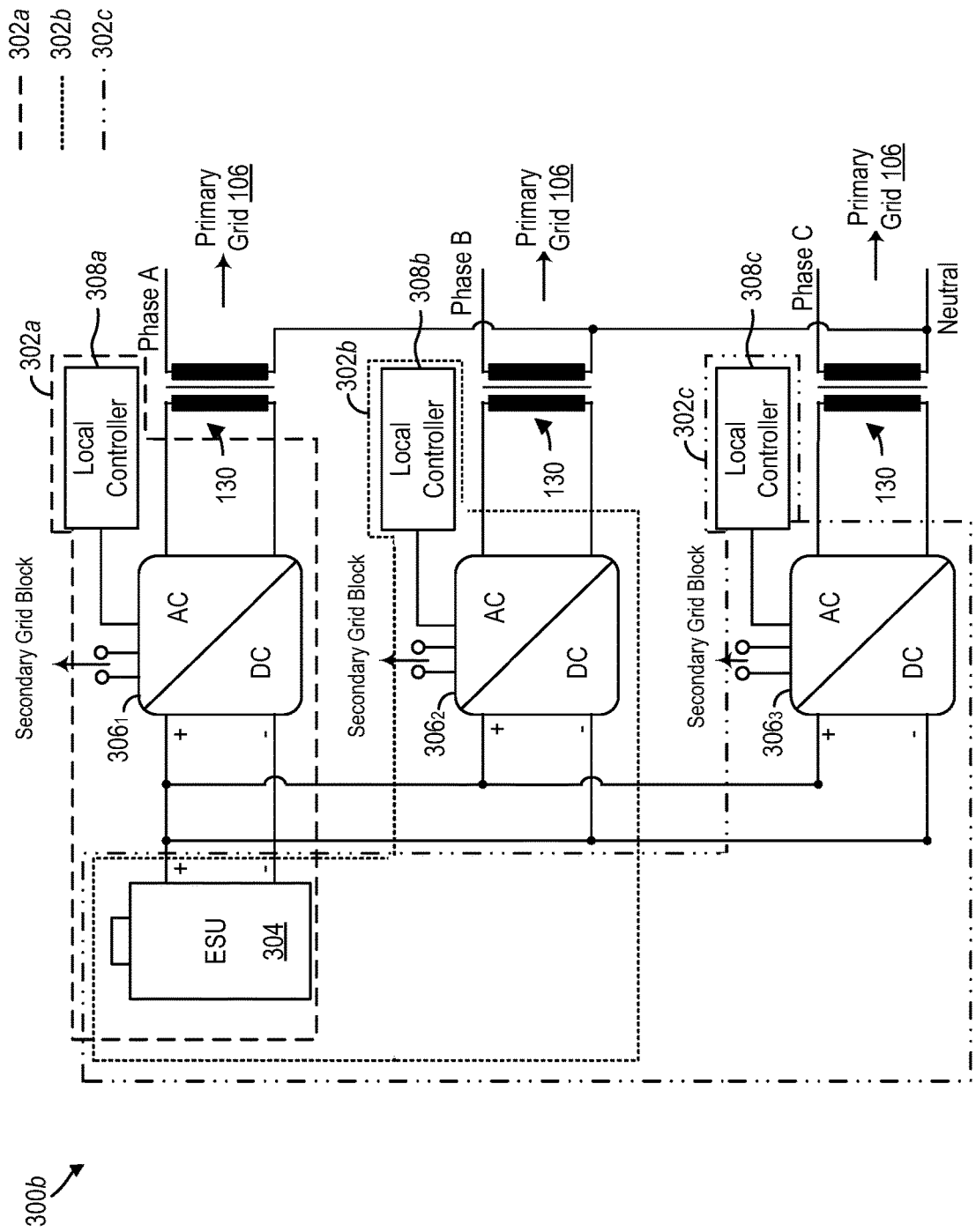
FIG. 3B shows an example design including multiple parallel local balancing systems, in accordance with some embodiments.
Figure 3C:
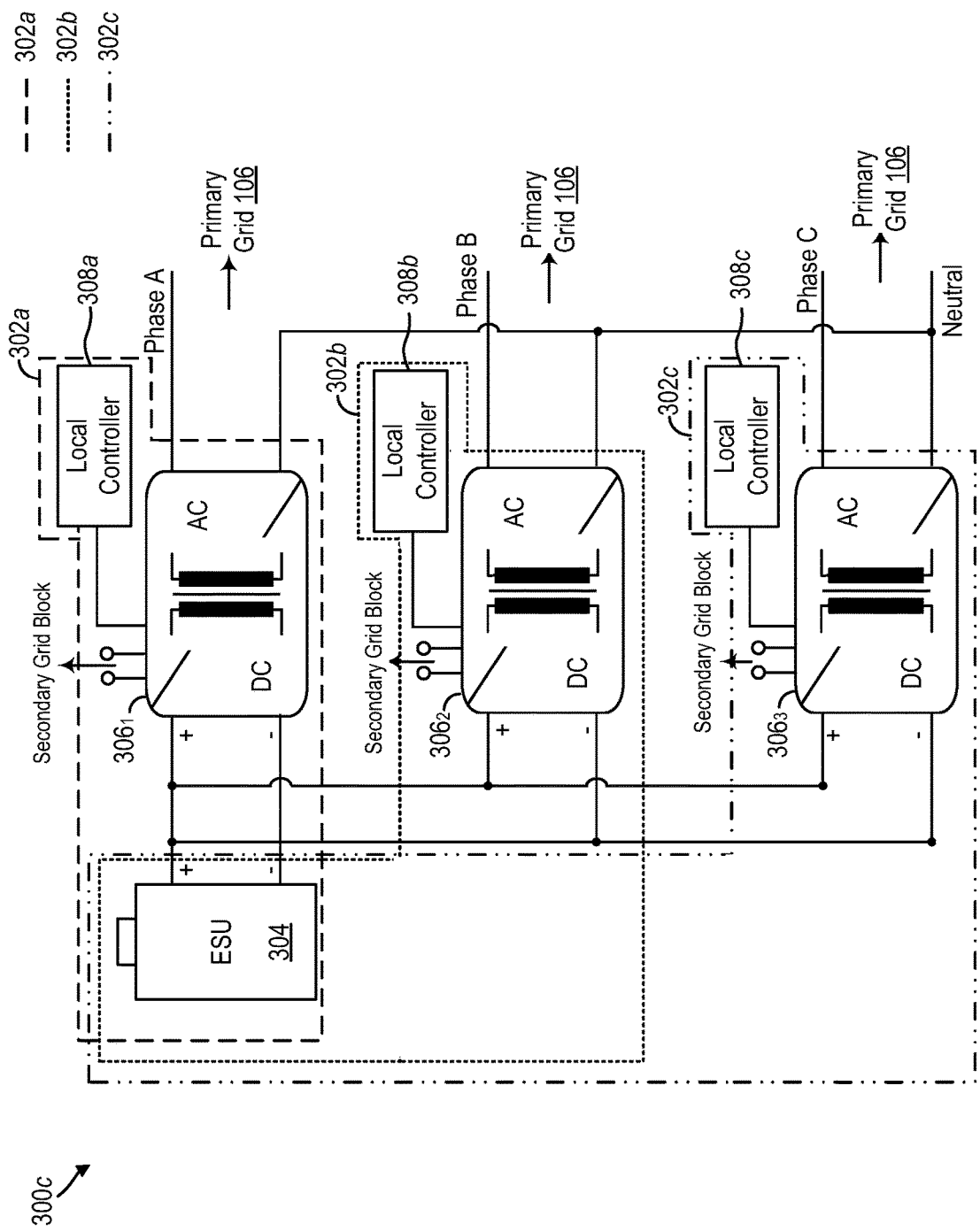
FIG. 3C shows an example design including multiple parallel local balancing systems, in accordance with some other embodiments.

Related to FIGS. 3B and 3C, in some example cases, a single ESU 304 may be shared between multiple local systems 302. For example, this may be the case where multiple local balancing systems 302 are positioned within close geographic proximity of each other (e.g., within 1 kilometer radius).

Figure 3D:
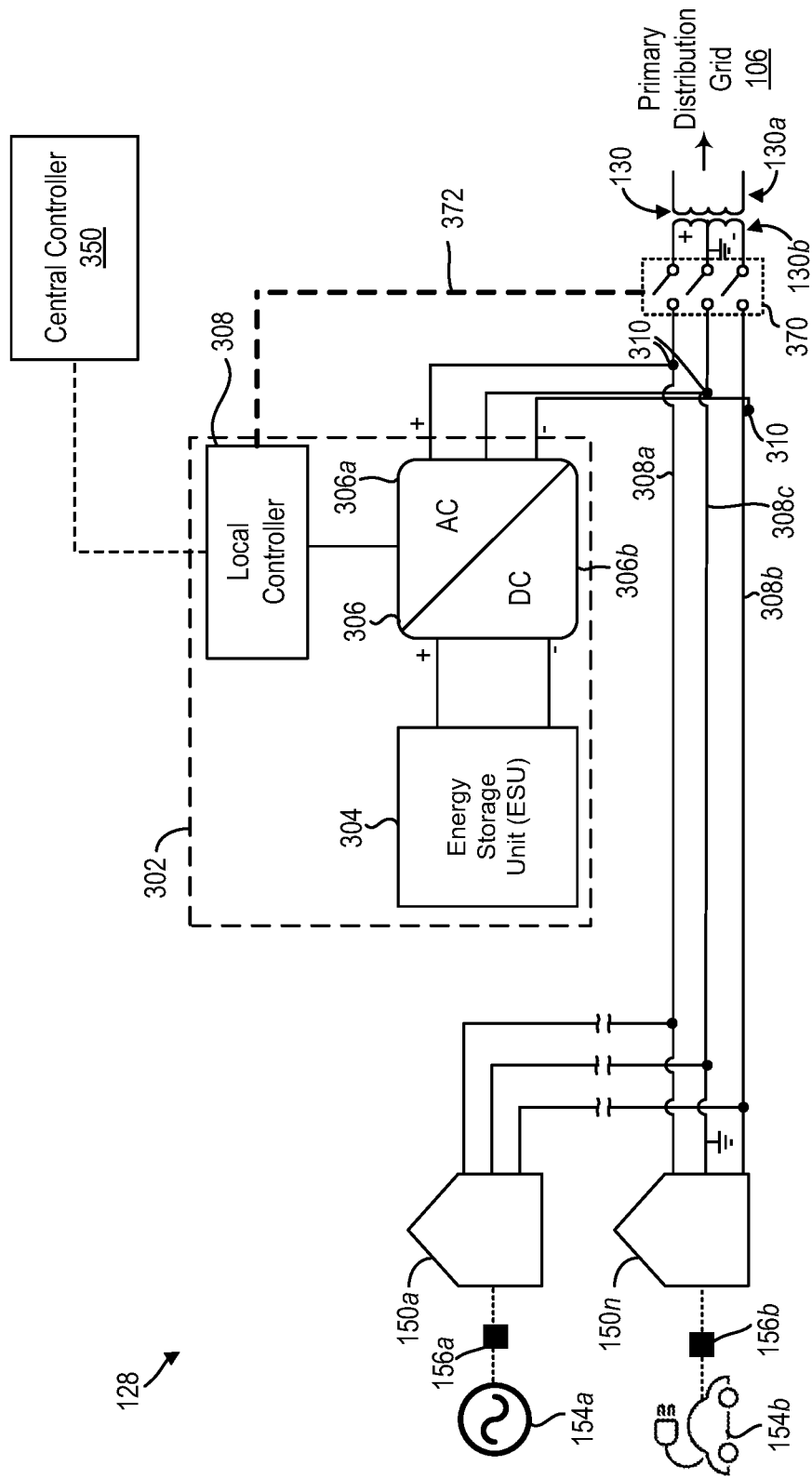
FIG. 3D shows an example illustration of a secondary grid block that includes a local balancing system and a controllable switch, in accordance with another embodiment.

Reference is now made to FIG. 3D, which shows an example illustration of a secondary grid block 128 that includes a local balancing system 302, in accordance with another embodiment.

In this embodiment, with energy storage built in the ESU 304, the ESU 304 may also act as an energy source if a fault occurs in the grid. For example, a controllable switch 370 may be provided on the secondary transformer side 130b and before the coupling or connection point 310 of the local balancing system 302. The controllable switch 370 may be, for example, a transfer switch, a circuit breaker, a manual switch, or a recloser, can be placed after the distribution transformer.

As shown, the controllable switch 370 may be controlled by the local controller 308 via a wired or wireless communication path 372. In the event of a detected grid fault, the local controller 308 may open the switch 370, thereby decoupling the secondary grid block 128 from the primary distribution grid 106, and transforming the secondary distribution block 128 into a microgrid supplied by the ESU 304. This, in turn, may ensure, for example, a safety working condition for utility personnel who work on the fault in the primary distribution system.

In some cases, a grid fault is detected by monitoring grid-block voltage (e.g., via one or more sensors 314). If there is a quick voltage dip and the voltage drops below a certain limit within a very short of time, this may indicate the grid has a fault and voltage supply is lost. Accordingly, in response, the local controller 308 may open the controllable switches 370.

In at least some cases, the local balancing systems 302 may include anti-islanding functions. In these cases, if the controllable switch 370 does not open, the anti-islanding can ensures that the inverter (SPESU) disconnect from the grid.

While not explicitly illustrated, it will be understood that the local balancing system 302 in FIG. 3D may also include other features illustrated in FIG. 3A, such as one or more sensors 314 coupled to the local controller 308. It will also be understood that the controllable switch 370 may also be incorporated into any other secondary grid block architecture disclosed or illustrated herein.

Figure 7A:
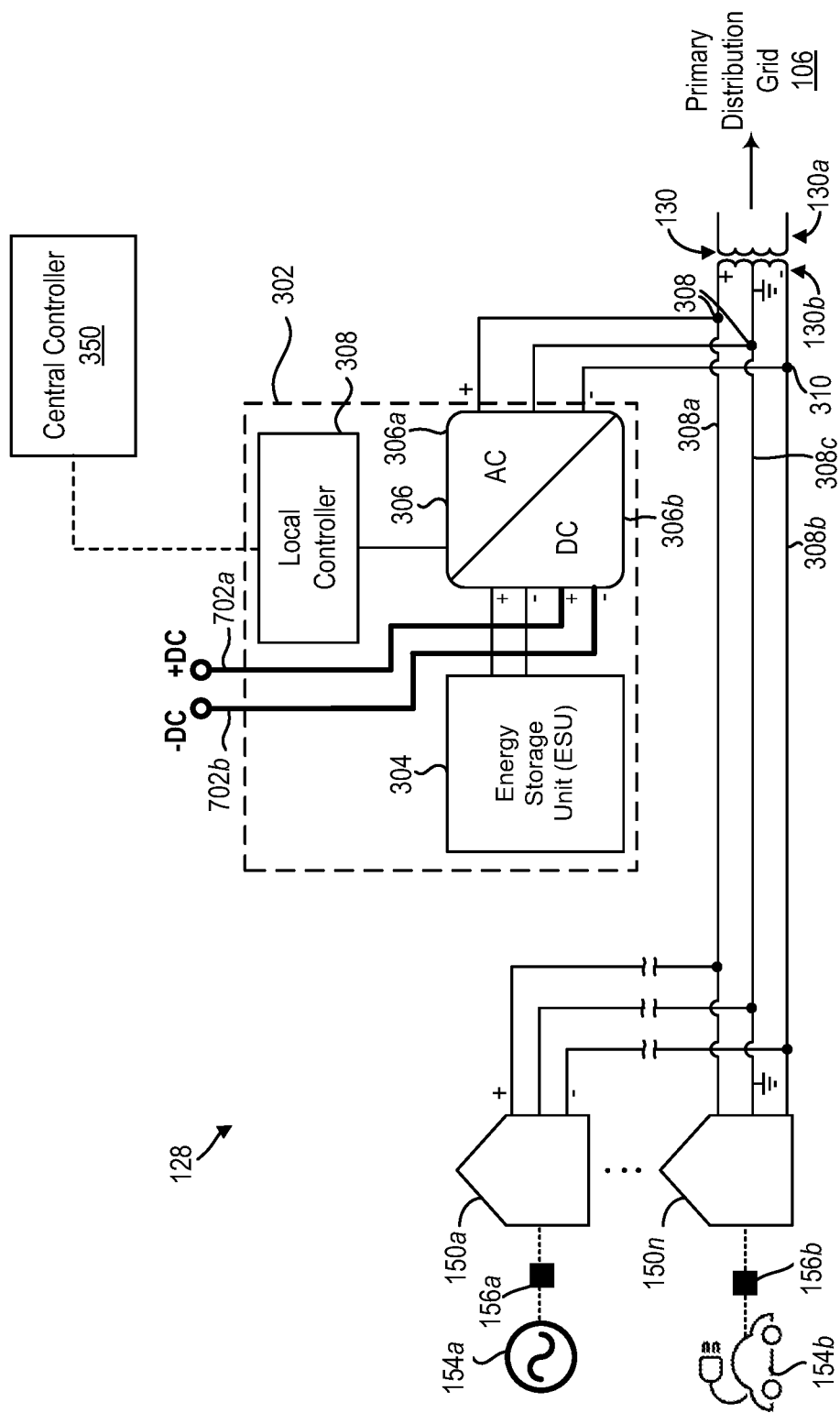
FIG. 7A shows an example illustration of a secondary grid block that includes a local balancing system having one or more direct current (DC) feeders, in accordance with embodiments provided herein.
Figure 7B:
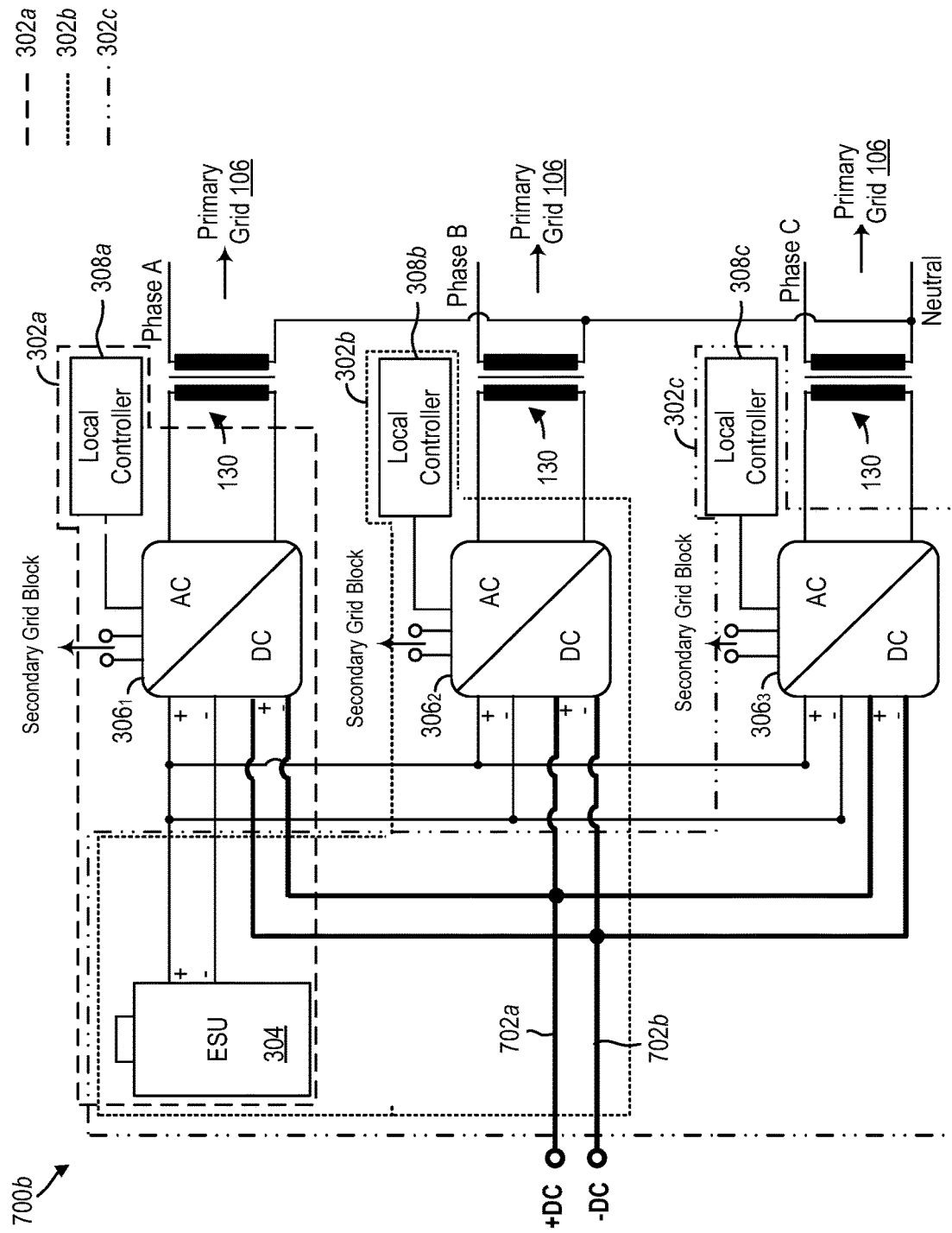
FIG. 7B shows an example design for multiple parallel local balancing systems with DC feeders, in accordance with some embodiments.
Figure 7C:
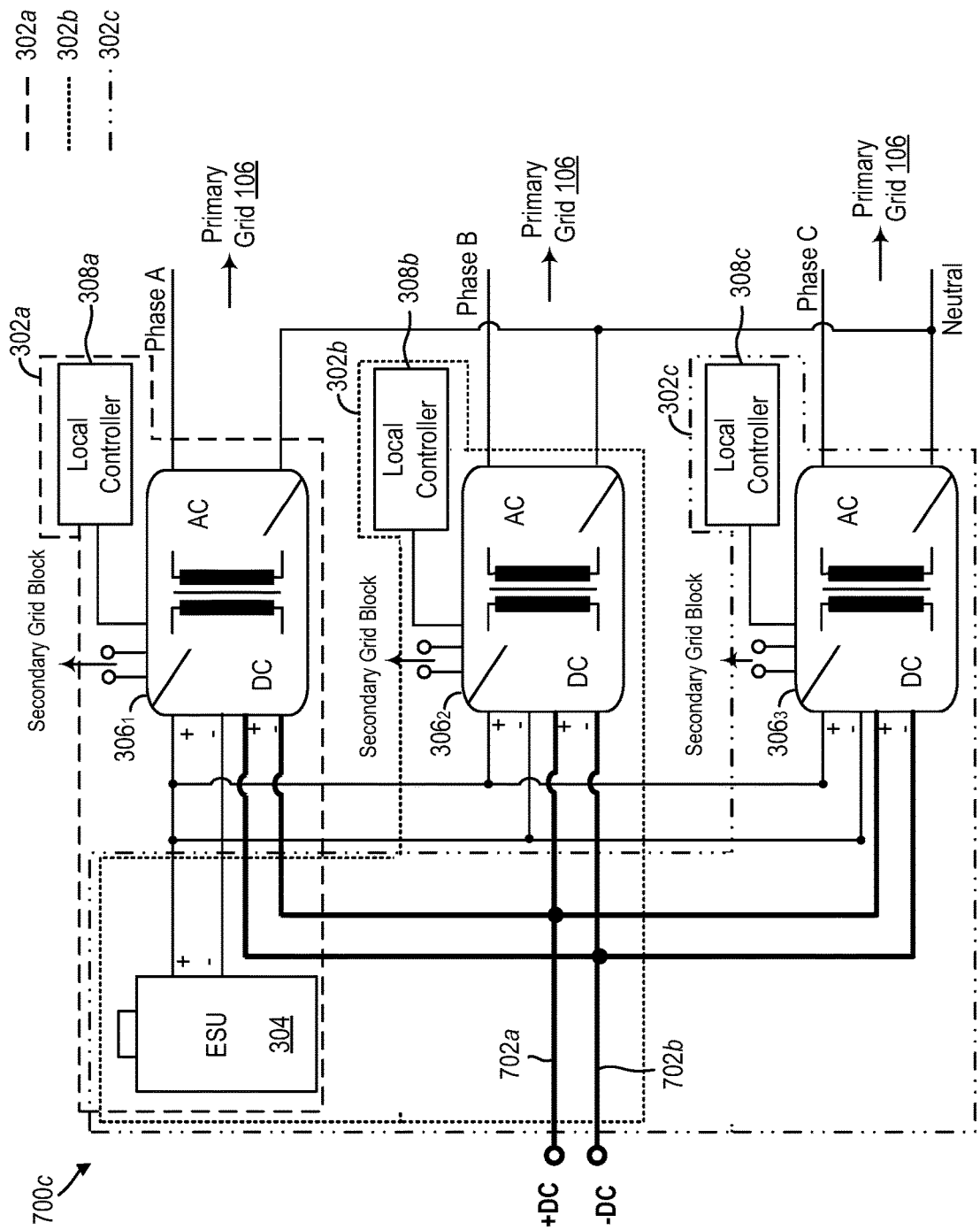
FIG. 7C shows an example design for multiple parallel local balancing systems with DC feeders, in accordance with some other embodiments.

Reference is now made to FIGS. 7A-7C, which shows further example embodiments of local balancing systems.

The local balancing systems illustrated in FIGS. 7A-7C are generally analogous to those illustrated in FIGS. 3A-3C, with the exception that the systems in FIGS. 7A-7C further include DC links 702 (or DC feeders) forming DC connection terminals.

As shown in each of FIGS. 7A-7C, a positive DC feeder 702a and a negative voltage DC feeder 702b may be connected to the DC side of converter 306 in the local balancing system 302. For example, in FIG. 7A, the local balancing system 302 may include DC feeders 702 that are connected to the DC-side 306b of the converter 306. In some cases, as shown in block diagrams 700b, 700c of FIGS. 7B and 7C, respectively, DC feeders 702 can also extend from multiple parallel converters $306_1$-$306_3$ included in separate local balancing systems 302a-302c.

In at least one embodiment, the DC feeders 702 can be used for connecting separate DC grids. For example, the DC feeders 702 can connect to various integrated energy resources (e.g., solar panels), DC loads (e.g., EV chargers), as well as additional energy storage units. In particular, the new DERs and electrical loads can be directly coupled to the DC grid rather than to the AC secondary grid block 128, e.g., via inverters, which can alleviate power quality issues in the secondary grid block. In some cases, the DC grid can also include further connected energy storage units, which can directly supply DC power to new electric loads such as EV chargers.

In view of the foregoing, the inclusion of DC feeders 702 can allow extending the existing secondary AC distribution grid into a hybrid AC-DC grid using a simple to install and modulator local balancing systems 302. This, in turn, can facilitate quick future expansion of the grid and can rapidly increase the grid hosting capacity of the system. Further, it can enable utility companies to install and use the modular local balancing systems 302 to postpone costly upgrade of the distribution line and better utilize the existing distribution capacity to accommodate new DC sources and loads.

While the DC feeders 702 have not been illustrated in each diagram of the local balancing system 302 provided herein, it will be understood that any configuration of the local balancing system 302 herein can incorporate DC feeders 702.

Figure 8A:
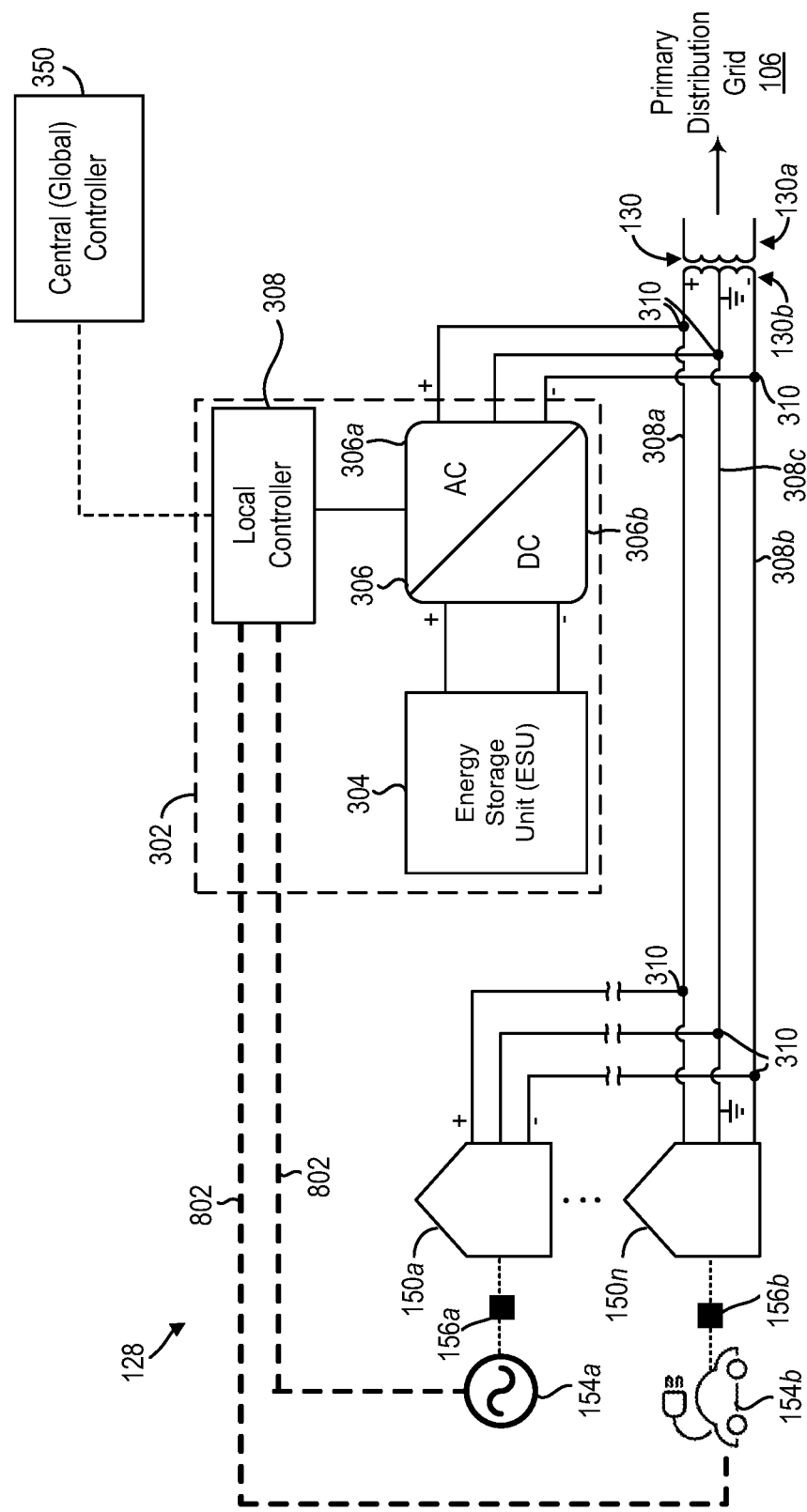
FIG. 8A shows a simplified block diagram of a secondary grid block that includes a local balancing system and one or more controllable electrical nodes, in accordance with some embodiments.

Reference is now made to FIG. 8A, which shows an example illustration of a secondary grid block 128 that includes a local balancing system 302 and one or more controllable electrical nodes 154, in accordance with some embodiments.

In at least some embodiments, the local balancing system 302 may be operable to perform local power and energy management tasks by communicating and controlling the controllable electrical nodes 154 (e.g., DERs and EV chargers 154).

As shown in FIG. 8A, the local controller 308—in a secondary grid block 128—may communicate with one or more electrical sources and loads 154 via wired or wireless communication channels 802. By communicating with the power sources and/or loads 154, the local controller 308 may be operable to implement "smart control" of the block 128. For example, the local controller 308 may implement smart charging functions to schedule the charging sequences of EV chargers 154b or schedule increased electrical output of electrical sources 154a. In various cases, this can be done to prevent overloading the corresponding distribution transformer 130, even with a small ESU 304.

Figure 8B:
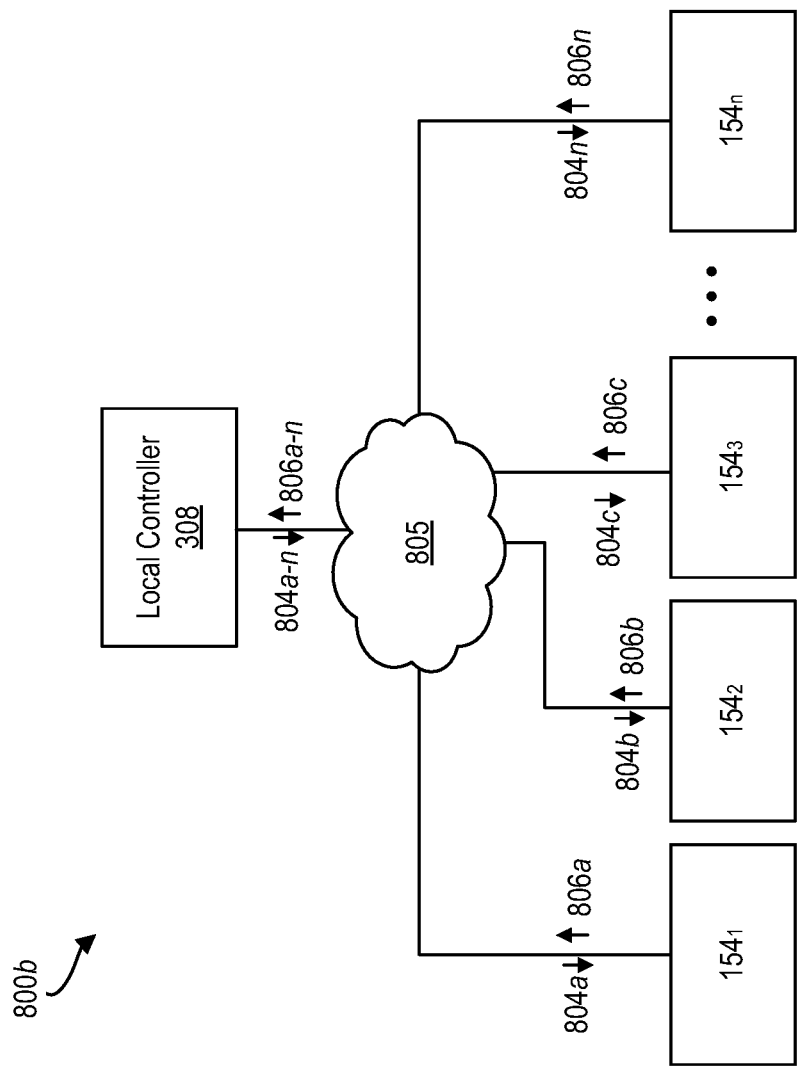
FIG. 8B show an example embodiment of a local grid control system for a secondary grid block, in accordance with some embodiments.
Figure 8C:
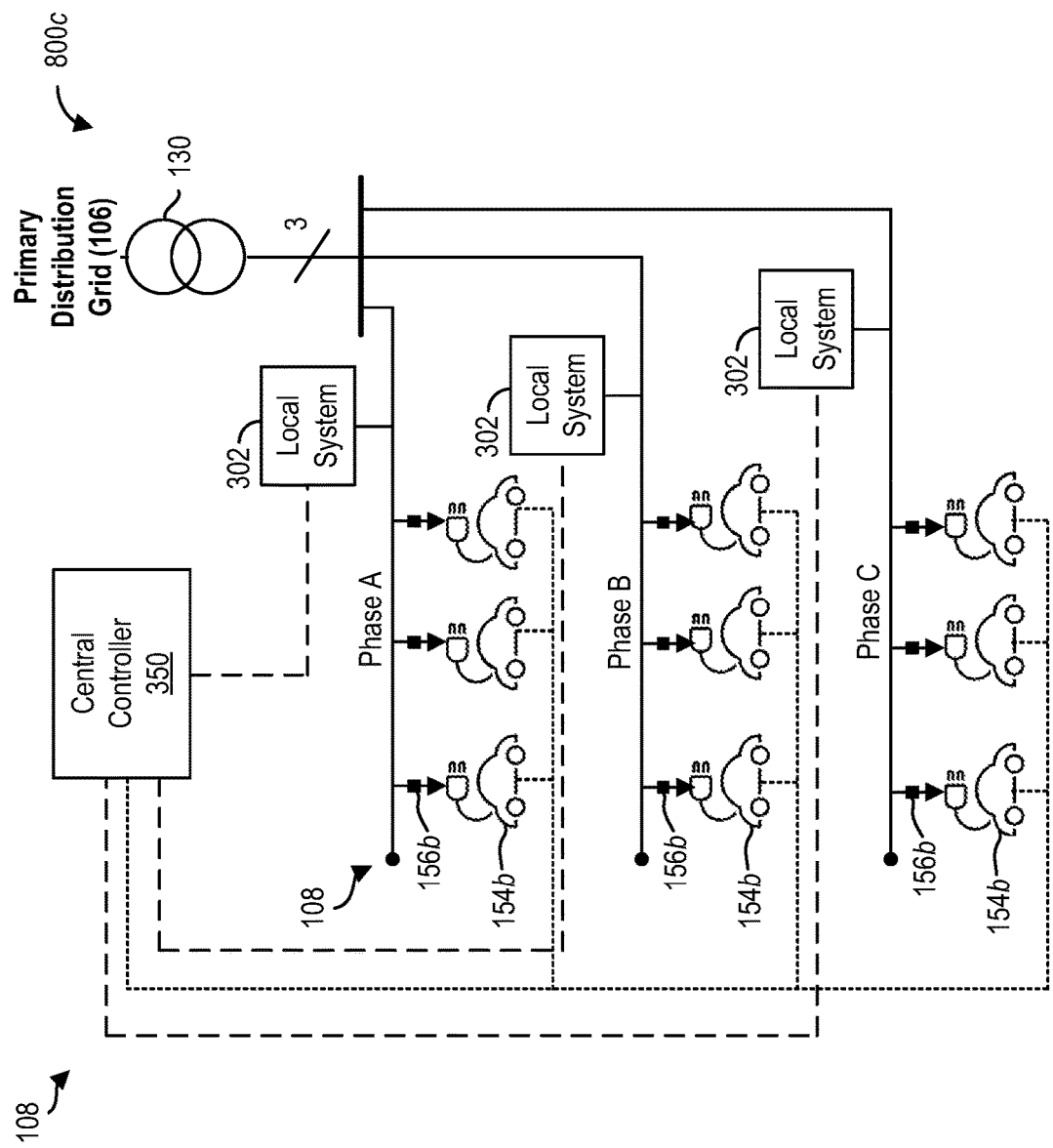
FIG. 8C shows an illustrative representation of a distribution grid control system, in accordance with some other embodiments.

FIG. 8B shows a local grid control system 800b and illustrates the interconnection between the local controller 308 and various electrical sources and loads $154_1$-$154_n$ in a respective secondary grid block 128.

As shown, the local controller 308 communicates with the plurality of electrical nodes 154 in the secondary grid block 128 via a network 805. Network 805 may be a wired or wireless network and may be the same as network 402 in FIG. 4A, or may be a different network, e.g., a local network.

Local controller 308 may generate and transmit local control signals 804a-804n, via network 804, to each controllable node 154. For example, local controller 308 can generate and transmit local control signals 804 to a controllable electric source 154a (e.g., a DER, such as a photovoltaic solar cell) to activate the electrical source and/or increase or decrease electrical power generation from the source immediately or at a scheduled future point in time, and for a pre-determined period of time. In other cases, local controller 308 can also generate and transmit local control signals 804 to controllable electrical loads 154b (e.g., EV chargers) to activate the loads and/or increase or decrease electrical power draw by the loads, e.g., either immediately or at a scheduled future point in time. In this manner, the local controller 308 may be able to control and adjust the power supply and demand within the secondary grid block 128.

In some cases, at least some of the controllable nodes 154 may transmit respective node status signals 806a-806n to the local controller 308. The data signals 806 may include power input or output (e.g., real-time or near real-time) in respect of each controllable node 154. This information can be used by the local controller 308 to monitor the node status of each controllable node 154, which can assist in generating the local control signals 804.

In some embodiments, the controllable nodes 154 can communicate directly with the central controller 350, rather than with the local controller 308. For example, controllable nodes 154 can send node status signals 806a-806n directly to the central controller 350. In turn, the central controller 350 may re-transmit the status signals to the respective local controller 308. This may be occur, for example, where it is difficult for nodes 154 to establish the communication channel with the local controller 308, but may have connectivity (e.g., Wi-Fi connectivity) with the central controller.

Reference is briefly made to FIG. 8C, which shows another illustrative representation 800c of the distribution grid control system 800b of FIG. 8B.

In various cases, the local balancing systems 302 can be used to balance three-phase voltages in an EV charging network. While the overall system may be designed to have the same number of EV chargers 154b in each phase, the numbers of active chargers and the charging power of the three phases can be different in actual operation, resulting in unbalanced voltages. Additionally, the high instant charging power may also overload the transformer 130 and lead to undervoltage issues. In this system, the central controller 350 can be used to communicate with and manage the EV chargers 154b and the local balancing system 302 to reduce the peak demand and also balance the voltages in the three phases in a manner as previously described.

Figure 9A:
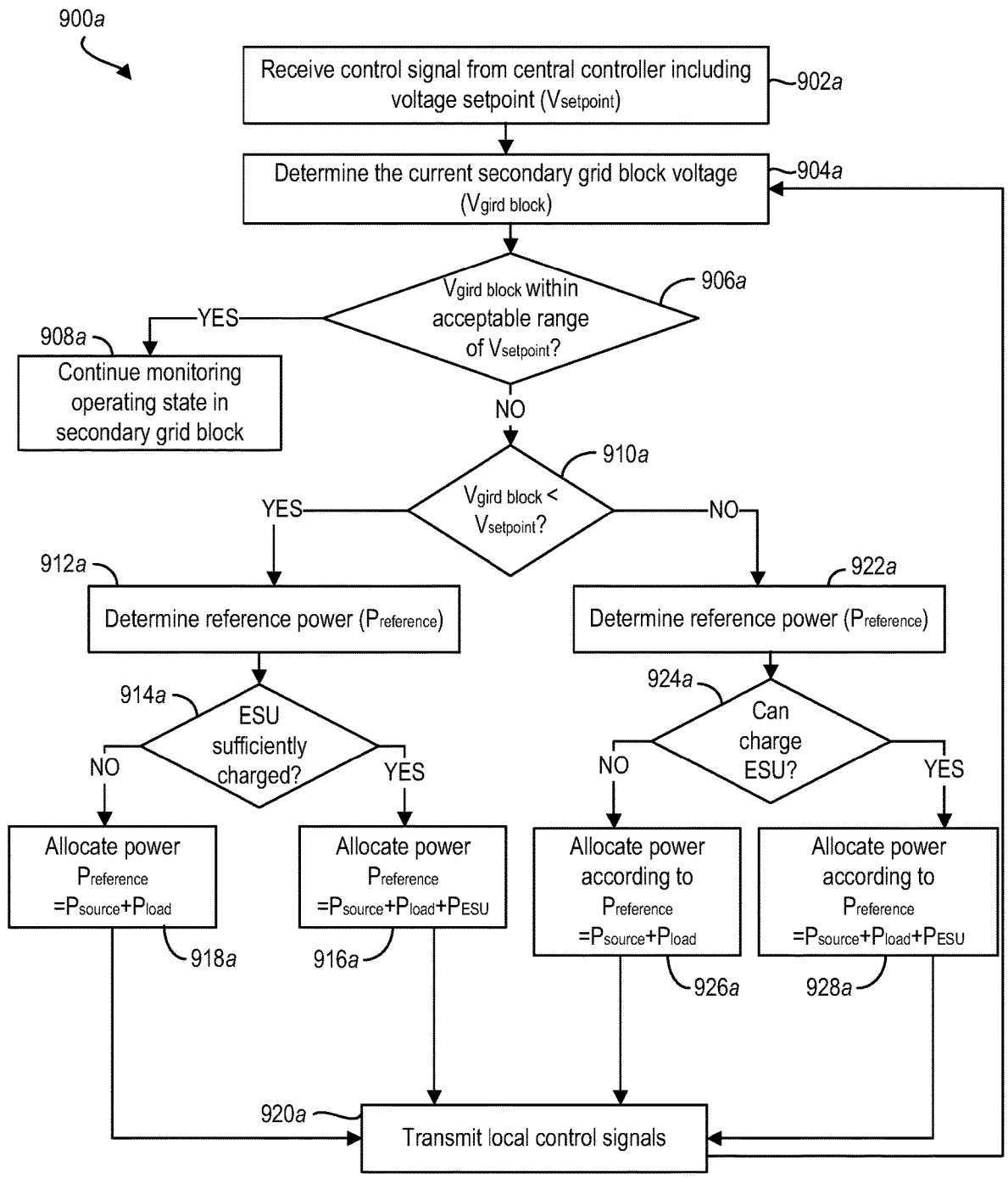
FIG. 9A shows a process flow for an example embodiment of a method for voltage regulation in a secondary grid block that includes one or more controllable electrical nodes, and from the perspective of a local controller, in accordance with some embodiments.

Reference is now made to FIG. 9A, which shows a process flow for an example embodiment of a method 900a for voltage regulation in a secondary grid block which includes controllable nodes (e.g., as shown in FIG. 8A), according to some embodiments. Method 900a can be considered to be an example application of method 500d in the case that the secondary grid block 128 includes controllable nodes. Method 900a may be executed, for example, by a processor 1002a of a local controller 308.

As shown, at act 902a, the local controller 308 can receive a control signal 404 from the central controller 350. The control signal 404 can include a voltage setpoint ($V_{setpoint}$) to be implemented by the local controller 308 in the corresponding secondary grid block 128. The voltage setpoint can be determined by the central controller 350, for example, as previously described in respect of method 500a of FIG. 5A.

At act 904a, the local controller 308 can determine the current magnitude of the AC single-phase voltage in the corresponding secondary grid block 128 ($V_{grid\ block}$). For example, this may occur using voltage sensor data received from a voltage sensor 314 located around the distribution transformer 130.

At act 906a, the local controller 308 can determine whether the secondary grid block voltage ($V_{grid\ block}$) is within an acceptable pre-defined range of the voltage setpoint ($V_{setpoint}$) (e.g., within 1% to 2%).

If the secondary grid block voltage ($V_{grid\ block}$) is within the acceptable pre-defined range of the voltage setpoint ($V_{setpoint}$), then at act 908a, the local controller 308 can continue monitoring the operating state in the secondary grid block 128.

Otherwise, at act 910a, the local controller 308 can determine whether the secondary grid block voltage ($V_{grid\ block}$) is less than the voltage setpoint ($V_{setpoint}$).

If the secondary grid block voltage ($V_{grid\ block}$) is less than the voltage setpoint ($V_{setpoint}$), this may be a result of high power demand in the secondary grid block 128. Accordingly, to mitigate the high power demand, the local controller 308 can execute one or more response actions at acts 912a-918a to reduce power demand and/or increase power generation in the secondary grid block 128. In this manner, the local controller 308 can increase the magnitude of the single-phase AC voltage such that the voltage is within the acceptable range of the voltage setpoint ($V_{setpoint}$).

Accordingly, at act 912a, the local controller 308 may initially determine a reference power value ($P_{reference}$). The reference power ($P_{reference}$) can represent the net power flow in the secondary grid block 128 required for the secondary grid block voltage ($V_{grid\ block}$) to be within the acceptable range of the voltage setpoint ($V_{setpoint}$). In at least one embodiment, the reference power ($P_{reference}$) is determined based on the difference between the secondary grid block voltage ($V_{grid\ block}$) and the voltage setpoint ($V_{setpoint}$), as well as the feeder impedance data, following the principles in FIG. 1C.

At 914a, the local controller 308 may initially determine whether the ESU 304 is sufficient charged. In some cases, one or more of the ESUs 304 may include a battery management system or associated sensors which can provide, the local controller 308, with state charge (SoC) information, as is known in the art. If the ESU 304 is sufficiently charged, then the local controller 308 can discharge some of the stored power in the ESU 304 to offset the power demand, and increase the secondary grid block voltage to within the voltage setpoint ($V_{setpoint}$). In at least some embodiment, the ESU 304 is determined to be sufficiently charged if the SoC is between approximately 20% to 100% charge.

If it is determined that the ESU 304 is sufficiently charged, then at 916a the local controller 308 can control a combination of any one, or one or more of the converter 306, or the controllable nodes 154 (e.g., sources 154a and loads 154b) to decrease power demand.

For example, the local controller 308 can control the converter 306 to inject stored power in the ESU 304 into the secondary grid block 128 to achieve the reference power value ($P_{reference}$). In other cases, rather than relying only on discharging the ESU 304, the local controller 308 can also control one or more electric loads 154b to draw less power from the secondary grid block 128, e.g., so as to reduce power demand and increase the secondary grid block voltage. Still further, the local controller 308 can also control one or more electric sources 154a to inject more power into the secondary grid block 128.

Accordingly, through any combination of (i) discharging power from the ESU 304, (ii) controlling electric loads 154b to draw less power, and/or (iii) controlling the electric sources 154a to inject more power—the local controller 308 can compensate for the power demand offset and achieve the target reference power ($P_{reference}$).

In at least some embodiments, the local controller 308 can control the total power output from the ESU 304 ($P_{ESU}$), total power draw from the electrical loads 154b ($P_{load}$) and total power injection from the electrical sources 154a ($P_{source}$) to achieve $P_{reference}=P_{source}+P_{load}+P_{ESU}$, wherein power generation (e.g., $P_{source}$ and $P_{ESU}$) is defined positively and power draw (e.g., $P_{load}$) is defined negatively, whereby the positive and negative definition refers to the power direction. When local balancing system 308 generates power, $P_{ESU}$ is positive, but when local balancing system 308 chargers the ESU, it draws power and becomes negative. In some cases, $P_{source}$, $P_{load}$ and $P_{ESU}$ are controlled to prevent any of the terms from reaching a "zero" value. In some other cases, $P_{source}$ and $P_{load}$ can be changed in a wider range, while $P_{ESU}$ is kept within a smaller range to extend the lifetime of the ESU.

In some cases, when determining how to control the electrical loads 154b to achieve the desired total power draw ($P_{load}$), the local controller 308 can control all electrical loads 154b such as to evenly distribute the power draw among all loads. That is, all loads are controlled to have the same power draw, such that the total power draw equals the desired total power draw ($P_{load}$). In other cases, the electrical loads 154b can be controlled to achieve an uneven distribution in power draw. For example, where the electrical loads 154b are EVs, uneven distribution can be based on factors such as sequence of plug-in and car battery state of charge (SoC). Similar considerations can also inform the local controllers 308 decisions when determining how to control the electrical sources 154a to achieve a desired total power injection ($P_{sources}$).

At 920a, based on the determination made at act 916b, the local controller 308 may transmit local control signals 806 to the respective converter 306, local sources and loads 154 in order to achieve the target reference power ($P_{reference}$).

Returning to act 914a, if the ESU 304 does not have sufficient charge to discharge to offset the power demand, then at act 918a, the local controller 308 may rely only on controlling the local electrical sources and/or loads 154 such that $P_{reference}=P_{source}+P_{load}$. At 920a, the local control 308 may again transmit local control signals 806 to the respective local sources and loads 154 in order to achieve the target reference power ($P_{reference}$).

Returning to act 910a, if the secondary grid block voltage ($V_{grid\ block}$) is greater than the voltage setpoint ($V_{setpoint}$), this may be a result of increased electrical power input by electrical sources 154a. For example, an increased amount of DERs may be connected to the secondary grid block 128 and activated concurrently. Accordingly, to mitigate the high voltage, the local controller 308 can execute one or more response actions at acts 922a-928a to decrease power generation and/or increase power demand in the secondary grid block 128. In this manner, the local controller 308 can decrease the magnitude of the single-phase AC voltage such that the voltage is within the acceptable range of the voltage setpoint ($V_{setpoint}$).

To this end, acts 922a-928a are generally analogous to acts 912a-918a. At 922a, the local controller 308 can again determine a reference power value ($P_{reference}$) required for the secondary grid block voltage ($V_{grid\ block}$) to be within the acceptable range of the voltage setpoint ($V_{setpoint}$). At 924a, a determination is made as to whether the ESU 304 can be further charged (e.g., ESU is not at 100% charge state based on SoC information received from a battery management system of the ESU). If the ESU 304 can be further charged, then the local controller 304 can control converter 306 to draw AC single-phase power out of the secondary grid block 128, and store the power as DC power in the ESU 304. In this manner, the voltage in the secondary grid block 128 may be reduced to the level of the voltage setpoint ($V_{setpoint}$).

At 926a, if the ESU 304 has capacity for further charging, the local controller 308 can control any combination of the power drawn by the ESU 304, power drawn by the electrical loads 154a and/or power injected by the electrical sources 154b such that $P_{reference}=P_{source}+P_{load}+P_{ESU}$, wherein power generation (e.g., $P_{source}$) is defined positively and power draw (e.g., $P_{ESU}$, $P_{load}$) is defined negatively. Alternatively, if the ESU 304 has no more capacity for further charging, the local controller 308 may rely only on controlling the local electrical sources and/or loads 154 such that $P_{reference}=P_{source}+P_{load}$. Once the determinations are made at acts 926a or 928a, the local controller 308 can transmit appropriate local control signals 806 to the ESU 304, local electrical sources 154a, and/or local electrical loads 154b.

Once the local control signals are transmitted by the local controller 308, method 900a may return to act 906a to determine (or measure) the AC single-phase voltage in the corresponding secondary grid block 128 ($V_{measured}$). Method 900a may then continue iterating until the determination at act 906a is positive (e.g., true).

Figure 9B:
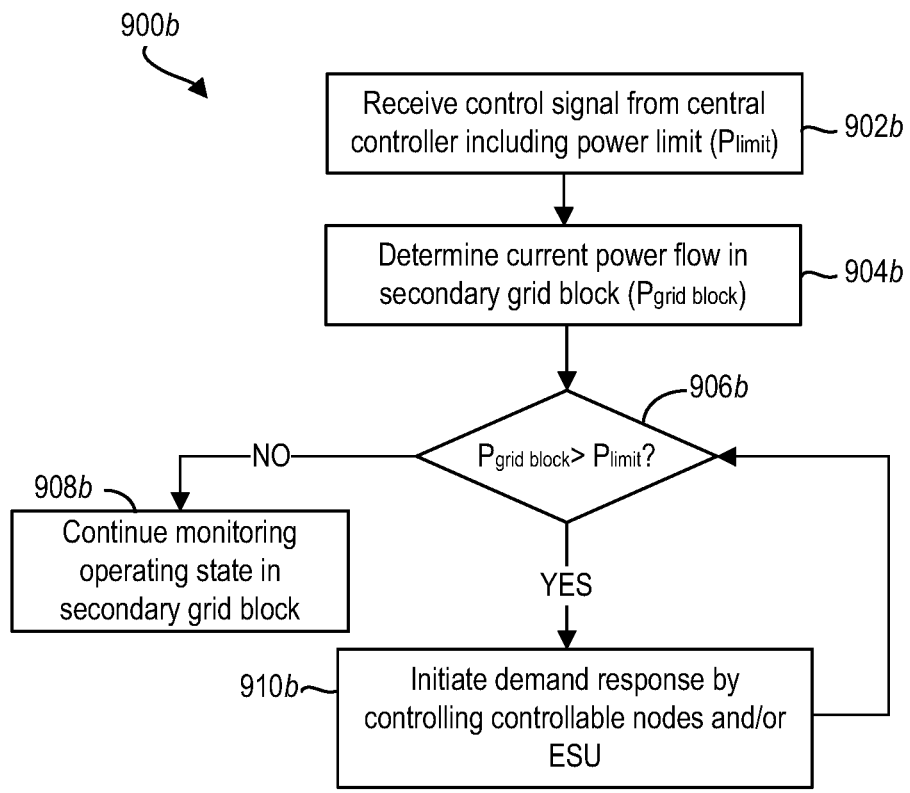
FIG. 9B shows a process flow for an example embodiment of a method for power balance control in a secondary grid block that includes one or more controllable nodes, and from the perspective of the local controller.

Reference is now made to FIG. 9B, which shows a process flow for an example embodiment of a method 900b for power balance control in a secondary grid block that includes one or more controllable nodes, and from the perspective of a local controller. Method 900b can be considered to be an example application of method 500e in the case that the secondary grid block 128 includes controllable nodes. Method 900b may be executed, for example, by a processor 1002a of a local controller 308.

At 902b, the local controller 308 can receive a control signal from the central controller 350. The control signal can include a power limit command ($P_{limit}$) in respect of a maximum allowed power flow through the distribution transformer 130. In some embodiments, the power limit ($P_{limit}$) can simple match the maximum rating of the distribution transformer 130.

At 904b, the local controller 308 can determine the power flow through the secondary grid block ($P_{grid\ block}$). For example, this can be determined based on sensors 314 positioned at the distribution transformer 130.

At 906c, the local controller 308 can determine whether the whether power flow through the secondary grid block ($P_{grid\ block}$) is greater than the power limit ($P_{limit}$).

If the power flow through the secondary grid block ($P_{grid\ block}$) is not greater than the power limit ($P_{limit}$), then at 908b, the local controller 308 can continue monitoring the operating state of the secondary grid block 128.

Otherwise, at 910b, the local controller 308 can initiate a demand response. In at least one embodiment, the demand response can maximize DER generation and minimize charging demand from loads. For example, the local controller 308 may transmit local control signals 806a-806n to either one or more DERs or an ESU to increase power output, or one or more loads to minimize power draw. In some cases, act 910b may be analogues to acts 914a to 918a of method 900a whereby the power reference value ($P_{reference}$) is equal to the power limit ($P_{limit}$) in the received control signal. In this manner, the power flow through the distribution transformer 130 may be reduced.

Reference is now made to FIGS. 10A and 10B, which shows simplified block diagrams of an example local controller 308 (FIG. 10A) and a central controller 310 (FIG. 10B).

As shown, each of the local controller 308 and central controller 350 can include a respective processor 1002a, 1002b connected via a respective data bus 1010a, 1010b to one or more respective communication interfaces 1004a, 1004b, memories 1006a,1006b and I/O interfaces 1008a, 1008b.

Each processor 1002a, 1002b may comprise a computer processor, such as a general purpose microprocessor. In some other cases, each processor 1002a, 1002b may be a field programmable gate array, application specific integrated circuit, microcontroller, or other suitable computer processor. Although reference herein to processor 1002a, 1002b is in the singular for ease of description, it will be understood that each processor 1002a, 1002b may in-fact comprise one or more processors.

Communication interfaces 1004a, 1004b may each comprise one or more data network interface, such as an IEEE 802.3 or IEEE 802.11 interface, for communication over a network.

Processors 1002a, 1002b are coupled to respective memories 1006a,1006b. Each memory 1006a,1006b may include both volatile and non-volatile memory. Non-volatile memory stores computer programs consisting of computer-executable instructions, which may be loaded into volatile memory for execution by a respective processor 1002a, 1002b as needed. It will be understood by those of skill in the art that references herein to local controller 308 or central controller 350 as carrying out a function or acting in a particular way imply that the respective processor 1002a, 1002b is executing instructions (e.g., a software program) stored in respective memory 1006a,1006b and possibly transmitting or receiving inputs and outputs via one or more interface. Each memory 1006a,1006b may also store data input to, or output from, respective processor 1002a, 1002b in the course of executing the computer-executable instructions.

I/O interfaces 1008a, 1008b may comprise any suitable input and/or output interfaces for connecting external devices, such as display devices, etc.

Various embodiments in accordance with the teachings herein are described to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the example embodiments described herein.

It should also be noted that the terms "coupled" or "coupling" as used herein can have several different meanings depending in the context in which these terms are used. For example, the terms coupled or coupling can have a mechanical, fluidic or electrical connotation. For example, as used herein, the terms coupled or coupling can indicate that two elements or devices can be directly connected to one another or connected to one another through one or more intermediate elements or devices via an electrical or magnetic signal, electrical connection, an electrical element or a mechanical element depending on the particular context. Furthermore coupled electrical elements may send and/or receive data.

Unless the context requires otherwise, throughout the specification and claims which follow, the word "comprise" and variations thereof, such as, "comprises" and "comprising" are to be construed in an open, inclusive sense, that is, as "including, but not limited to".

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Reference throughout this specification to "one embodiment", "an embodiment", "at least one embodiment" or "some embodiments" means that one or more particular features, structures, or characteristics may be combined in any suitable manner in one or more embodiments, unless otherwise specified to be not combinable or to be alternative options.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Similarly, throughout this specification and the appended claims the term "communicative" as in a "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), optical pathways (e.g., optical fiber), electromagnetically radiative pathways (e.g., radio waves), or any combination thereof. Example communicative couplings include, but are not limited to, electrical couplings, magnetic couplings, optical couplings, radio couplings, or any combination thereof.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

It should also be noted that there may be some elements that are used to implement at least part of the embodiments described herein that may be implemented via software that is written in a high-level procedural language such as object oriented programming. The program code may be written in C++, C#, JavaScript, Python, MATLAB, or any other suitable programming language and may comprise modules or classes, as is known to those skilled in object-oriented programming. Alternatively, or in addition thereto, some of these elements implemented via software may be written in assembly language, machine language, or firmware as needed. In either case, the language may be a compiled or interpreted language.

At least some of these software programs may be stored on a computer readable medium such as, but not limited to, a ROM, a magnetic disk, an optical disc, a USB key, and the like that is readable by a device having at least one processor, an operating system, and the associated hardware and software that is necessary to implement the functionality of at least one of the embodiments described herein. The software program code, when executed by the at least one processor of the device, configures the at least one processor and the device to operate in a new, specific, and predefined manner (e.g., as a specific-purpose computing device) in order to perform at least one of the methods described herein.

At least some of the programs associated with the devices, systems, and methods of the embodiments described herein may be capable of being distributed in a computer program product comprising a computer readable medium that bears computer usable instructions, such as program code, for one or more processors. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer useable instructions may also be in various formats, including compiled and non-compiled code.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A local balancing system comprising:
   an energy storage unit (ESU) operable to store direct current (DC) power;
   a power converter comprising a DC side and an AC side, the power converter being operable to convert between single-phase (AC) power and DC power, wherein the DC side is electrically coupled to the ESU and the AC side is electrically couplable to at least one secondary distribution block in a secondary distribution grid and wherein the at least one secondary distribution block includes one or more controllable single-phase nodes, the one or more controllable single-phase active nodes comprising one or more of controllable electric loads and controllable electrical sources; and
   a local controller coupled to the power converter and operable to control the power converter to convert between DC power and AC power, wherein the local controller is configured to communicate with the one or more controllable single-phase nodes and is configured to:
   determine a voltage in the at least one secondary grid block;
   determine if the voltage is below a voltage setpoint;
   if the voltage is below the voltage setpoint:
   control the converter to convert DC power, stored in the ESU, into single-phase AC power that is injected into the at least one secondary grid block; and
   if the voltage is less than the voltage setpoint, determine a reference power value;
   if the voltage is above the voltage setpoint, control the converter to draw single-phase AC power from the at least one secondary grid block, and convert the single-phase AC power into DC power that is stored in the ESU;
   determine if the ESU is sufficiently charged;
   if the ESU is sufficiently charged, control one or more of the converter, controllable electrical loads and controllable electrical sources to decrease demand and increase electrical power injection; and
   if the ESU is not sufficiently charged, control one or more of the controllable electrical loads and controllable electrical sources to decrease demand and increase electrical power injection.

2. The local balancing system of claim 1, wherein the local controller is further configured to:
   prior to determining if the current voltage is below the voltage setpoint, determine that the current voltage is outside a pre-determined range of the voltage setpoint.

3. The local balancing system of claim 1, wherein the ESU comprises one or more batteries, super capacitors, or fuel cells.

4. The local balancing system of claim 1, wherein the power converter is a single-stage or multi-stage AC-DC converter.

5. The local balancing system of claim 1, wherein the local controller includes a communication interface for communicating with a central controller.

6. The local balancing system of claim 5, wherein the local controller is further configured to:
   initially receive, via the communication interface, a control signal from the central controller, the control signal including the voltage setpoint.

7. The local balancing system of claim 5, further comprising one or more sensors that are coupled to the local controller, wherein the local controller is further configured to:
   based on sensor data received from the one or more sensors, monitor operating state data of the at least one secondary grid block; and
   transmit, via the communication interface, one or more operating state signals to the central controller, the one or more operating state signals including the operating state data.

8. The local balancing system of claim 7, wherein the one or more sensors comprise one or more of a voltage sensor or a current sensor.

9. The local balancing system of claim 8, wherein the operating state data comprises one or more of voltage data, current data and power flow data in the at least one secondary grid block.

10. The local balancing system of claim 7, wherein the one or more sensors are located around a distribution transformer that couples the at least one secondary distribution block to a primary distribution grid.

11. The local balancing system of claim 1, wherein a distribution transformer couples the at least one secondary distribution block to a primary distribution grid, and the local balancing system is connected to the at least one secondary distribution block at a second side of the distribution transformer.

12. The local balancing system of claim 1, wherein the local controller is further configured to:
   determine a power flow through the at least one secondary grid block;
   determine that the power flow is greater than a power limit; and
   in response, initiate a demand response.

13. The local balancing system of claim 12, wherein determining if the voltage is less than a voltage setpoint is performed by the local controller after determining that the power flow is greater than a power limit.

14. The local balancing system of claim 1, wherein the demand response comprises controlling the converter to convert DC power stored in the ESU into single-phase AC power that is injected into the at least one secondary grid block.

15. The local balancing system of claim 1, further comprising one or more DC feeders connected to the DC side of the power converter, wherein the DC feeders are couplable to an external DC grid.

16. The local balancing system of claim 1, wherein the electrical sources comprise distributed energy resources (DERs) and the electrical loads comprise activated electrical vehicle (EV) chargers.

17. A local balancing system comprising:
   an energy storage unit (ESU) operable to store direct current (DC) power;
   a power converter comprising a DC side and an AC side, the power converter being operable to convert between single-phase (AC) power and DC power, wherein the DC side is electrically coupled to the ESU and the AC side is electrically couplable to at least one secondary distribution block in a secondary distribution grid and wherein the at least one secondary distribution block includes one or more controllable single-phase nodes, the one or more controllable single-phase active nodes comprising one or more of controllable electric loads and controllable electrical sources; and
   a local controller coupled to the power converter and operable to control the power converter to convert between DC power and AC power, wherein the local controller is configured to communicate with the one or more controllable single-phase nodes and is configured to: determine a voltage in the at least one secondary grid block;
   determine if the voltage is below a voltage setpoint;
   if the voltage is below the voltage setpoint: control the converter to convert DC power, stored in the ESU, into single-phase AC power that is injected into the at least one secondary grid block; and
   if the voltage is above the voltage setpoint, control the converter to draw single-phase AC power from the at least one secondary grid block, and convert the single-phase AC power into DC power that is stored in the ESU;
   if the current voltage is not less than the voltage setpoint, determine a reference power value;
   determine if the ESU has capacity for charging;
   if the ESU has capacity for charging, controlling one or more of the converter, controllable electrical loads and controllable electrical sources to decrease demand and increase electrical power injection; and
   if the ESU does not have capacity for charging, control one or more of the controllable electrical loads and controllable electrical sources to decrease demand and increase electrical power injection.

18. The local balancing system of claim 1, wherein the local balancing system is connectable in parallel with one or more other local balancing systems to form a multi-phase balancing system.

19. A central controller comprising at least one processor coupled to a communication interface, the at least one processor being configured to:
   receive, via the communication interface, at least one operating state signal from at least one local controller, the at least one local controller is associated with a local balancing system defined in claim 1 connected to a secondary grid block of a plurality of secondary distribution grid blocks;
   determine, based on the at least one operating state signal, a current operating status of a secondary distribution grid;
   determine if the current operating status is within an acceptable range;
   if the current operating status is not within an acceptable range, determine that the secondary distribution grid is imbalanced;
   identify one or more target secondary grid blocks, of the plurality of secondary distribution grid blocks, causing the imbalance;
   generate operating control instructions for the one or more target secondary grid blocks; and
   transmit control signals to one or more local controllers associated with the one or more target secondary grid blocks, the control signals comprising the operating control instructions.

20. The central controller of claim 19, wherein,
   determining a current operating status of the secondary distribution grid comprises determining a system wide power demand;
   determining if the current operating status is satisfactory comprises determining if the system wide power demand exceeds a target system power limit;
   generating the operating control instructions comprises determining power limit instructions for the one or more target secondary grid blocks; and—the control signals includes the power limit instructions.

21. The central controller of claim 19, wherein,
   determining a current operating status of the secondary distribution grid comprises determining a magnitude of each phase voltage in the grid;
   determining if the current operating status is within an acceptable range comprises determining if the phase voltages are balanced; generating the operating control instructions comprises determining voltage setpoints for the one or more target secondary grid blocks; and—the control signals includes the voltage setpoints.

22. The local balancing system of claim 17, wherein the local controller is further configured to:
   prior to determining if the current voltage is below the voltage setpoint, determine that the current voltage is outside a pre-determined range of the voltage setpoint.

23. The local balancing system of claim 22, wherein the local controller is further configured to:
   initially receive, via the communication interface, a control signal from the central controller, the control signal including the voltage setpoint.

24. The local balancing system of claim 22, further comprising one or more sensors that are coupled to the local controller, wherein the local controller is further configured to: based on sensor data received from the one or more sensors, monitor operating state data of the at least one secondary grid block; and—transmit, via the communication interface, one or more operating state signals to the central controller, the one or more operating state signals including the operating state data.

25. The local balancing system of claim 24, wherein the one or more sensors are located around a distribution transformer that couples the at least one secondary distribution block to a primary distribution grid.

26. The local balancing system of claim 17, wherein a distribution transformer couples the at least one secondary distribution block to a primary distribution grid, and the local balancing system is connected to the at least one secondary distribution block at a second side of the distribution transformer.

27. The local balancing system of claim 17, wherein the local controller is further configured to:
  determine a power flow through the at least one secondary grid block;
  determine that the power flow is greater than a power limit; and-in response, initiate a demand response.

28. The local balancing system of claim 17, wherein the demand response comprises controlling the converter to convert DC power stored in the ESU into single-phase AC power that is injected into the at least one secondary grid block.

29. The local balancing system of claim 17, further comprising one or more DC feeders connected to the DC side of the power converter, wherein the DC feeders are couplable to an external DC grid.

30. The local balancing system of claim 17, wherein the local balancing system is connectable in parallel with one or more other local balancing systems to form a multi-phase balancing system.

* * * * *

UNITED STATES PATENT AND TRADEMARK OFFICE
CERTIFICATE OF CORRECTION

PATENT NO. : 12,132,314 B2  
APPLICATION NO. : 18/066386  
DATED : October 29, 2024  
INVENTOR(S) : Zhongyi Quan and Hao Tian Page 1 of 1

It is certified that error appears in the above-identified patent and that said Letters Patent is hereby corrected as shown below:

In the Claims

Claim 1, Column 34, Line 4:
"if the voltage is less than the voltage setpoint," should be deleted Signed and Sealed this
Eleventh Day of February, 2025

Coke Morgan Stewart
*Acting Director of the United States Patent and Trademark Office*